US008620793B2

(12) United States Patent
Knyphausen et al.

(10) Patent No.: US 8,620,793 B2
(45) Date of Patent: Dec. 31, 2013

(54) WORKFLOW MANAGEMENT SYSTEM

(75) Inventors: Iko Knyphausen, Alexandria, VA (US); Jochen Hummel, Brussels (BE)

(73) Assignee: SDL International America Incorporated, Sunnyvale, CA (US)

( * ) Notice: Subject to any disclaimer, the term of this patent is extended or adjusted under 35 U.S.C. 154(b) by 0 days.

(21) Appl. No.: 12/791,527

(22) Filed: Jun. 1, 2010

(65) Prior Publication Data

US 2010/0241482 A1 Sep. 23, 2010

Related U.S. Application Data

(63) Continuation of application No. 12/477,708, filed on Jun. 3, 2009, which is a continuation of application No. 09/317,979, filed on May 25, 1999, now abandoned, which is a continuation-in-part of application No. 09/303,499, filed on Apr. 30, 1999, now abandoned.

(60) Provisional application No. 60/125,078, filed on Mar. 19, 1999.

(51) Int. Cl.
*G06Q 40/00* (2012.01)

(52) U.S. Cl.
USPC ............. 705/37; 370/389; 370/392; 370/352; 704/10; 704/7; 704/2; 704/277; 704/257; 704/9; 704/8; 704/3; 704/5; 704/6; 704/4; 705/76; 705/65; 705/35; 705/27.2; 705/300; 705/301

(58) Field of Classification Search
USPC ......................................................... 705/37
See application file for complete search history.

(56) References Cited

U.S. PATENT DOCUMENTS

| 4,661,924 | A | 4/1987 | Okamoto et al. |
|---|---|---|---|
| 4,674,044 | A | 6/1987 | Kalmus et al. |
| 4,677,552 | A | 6/1987 | Sibley, Jr. |
| 4,789,928 | A | 12/1988 | Fujisaki |
| 4,903,201 | A | 2/1990 | Wagner |
| 4,916,614 | A | 4/1990 | Kaji et al. |
| 4,962,452 | A | 10/1990 | Nogami et al. |
| 4,992,940 | A | 2/1991 | Dworkin |

(Continued)

FOREIGN PATENT DOCUMENTS

| EP | 0262938 | 4/1988 |
|---|---|---|
| EP | 0668558 | 8/1995 |

(Continued)

OTHER PUBLICATIONS

Pennington, Paula K. Improving quality in translation through an awareness of process and selfediting skills. Eastern Michigan University, ProQuest, UMI Dissertations Publishing, 1994.*

(Continued)

*Primary Examiner* — Ryan Zeender
*Assistant Examiner* — Fawaad Haider
(74) *Attorney, Agent, or Firm* — Carr & Ferell LLP

(57) ABSTRACT

A network clearinghouse may be provided that brings together organizations (subjects) requiring outsourcing of a service and service providers (operators). The clearinghouse manages the bidding and awarding of contracts, by collecting and authorizing requests for proposals (RFPs), sending bid invitations to operators that meet the requirements of the subject, sending a notification that the contract has been awarded, and collecting payment from the subject and paying the operator.

18 Claims, 24 Drawing Sheets

(56) References Cited

U.S. PATENT DOCUMENTS

| | | | |
|---|---|---|---|
| 5,005,127 A | 4/1991 | Kugimiya |
| 5,020,021 A | 5/1991 | Kaji et al. |
| 5,075,850 A | 12/1991 | Asahioka et al. |
| 5,093,788 A | 3/1992 | Shiotani et al. |
| 5,111,398 A | 5/1992 | Nunberg et al. |
| 5,140,522 A | 8/1992 | Ito et al. |
| 5,146,405 A | 9/1992 | Church |
| 5,168,446 A | 12/1992 | Wiseman |
| 5,224,040 A | 6/1993 | Tou |
| 5,243,515 A | 9/1993 | Lee |
| 5,243,520 A | 9/1993 | Jacobs et al. |
| 5,283,731 A | 2/1994 | Lalonde et al. |
| 5,295,068 A | 3/1994 | Nishino et al. |
| 5,301,109 A | 4/1994 | Landauer et al. |
| 5,325,298 A | 6/1994 | Gallant |
| 5,349,368 A | 9/1994 | Takeda et al. |
| 5,408,410 A | 4/1995 | Kaji |
| 5,418,717 A | 5/1995 | Su et al. |
| 5,423,032 A | 6/1995 | Byrd et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,541,836 A | 7/1996 | Church et al. |
| 5,548,508 A | 8/1996 | Nagami |
| 5,587,902 A | 12/1996 | Kugimiya |
| 5,640,575 A | 6/1997 | Maruyama et al. |
| 5,642,522 A | 6/1997 | Zaenen et al. |
| 5,644,775 A | 7/1997 | Thompson et al. |
| 5,687,384 A | 11/1997 | Nagase |
| 5,708,825 A | 1/1998 | Sotomayor |
| 5,710,562 A | 1/1998 | Gormish et al. |
| 5,715,402 A | 2/1998 | Popolo |
| 5,724,593 A * | 3/1998 | Hargrave et al. ............ 704/7 |
| 5,751,957 A | 5/1998 | Hiroya et al. |
| 5,764,906 A | 6/1998 | Edelstein et al. |
| 5,765,138 A | 6/1998 | Aycock et al. |
| 5,794,219 A | 8/1998 | Brown |
| 5,799,269 A | 8/1998 | Schabes et al. |
| 5,802,502 A | 9/1998 | Gell et al. |
| 5,818,914 A | 10/1998 | Fujisaki |
| 5,819,265 A | 10/1998 | Ravin et al. |
| 5,826,244 A | 10/1998 | Huberman |
| 5,842,204 A | 11/1998 | Andrews et al. |
| 5,844,798 A | 12/1998 | Uramoto |
| 5,845,143 A * | 12/1998 | Yamauchi et al. ............ 704/2 |
| 5,845,306 A | 12/1998 | Schabes et al. |
| 5,848,386 A | 12/1998 | Motoyama |
| 5,850,442 A | 12/1998 | Muftic |
| 5,850,561 A | 12/1998 | Church et al. |
| 5,864,788 A | 1/1999 | Kutsumi |
| 5,884,246 A | 3/1999 | Boucher et al. |
| 5,895,446 A | 4/1999 | Takeda et al. |
| 5,917,484 A | 6/1999 | Mullaney |
| 5,950,194 A | 9/1999 | Bennett et al. |
| 5,956,711 A | 9/1999 | Sullivan et al. |
| 5,956,740 A | 9/1999 | Nosohara |
| 5,960,382 A | 9/1999 | Steiner |
| 5,966,685 A | 10/1999 | Flanagan et al. |
| 5,974,371 A | 10/1999 | Hirai et al. |
| 5,974,413 A | 10/1999 | Beauregard et al. |
| 5,987,401 A | 11/1999 | Trudeau |
| 5,987,403 A | 11/1999 | Sugimura |
| 6,044,363 A | 3/2000 | Mori et al. |
| 6,047,299 A | 4/2000 | Kaijima |
| 6,092,034 A | 7/2000 | McCarley et al. |
| 6,092,035 A | 7/2000 | Kurachi et al. |
| 6,131,082 A | 10/2000 | Hargrave, III et al. |
| 6,139,201 A | 10/2000 | Carbonell et al. |
| 6,154,720 A | 11/2000 | Onishi et al. |
| 6,161,082 A | 12/2000 | Goldberg et al. |
| 6,163,785 A | 12/2000 | Carbonell et al. |
| 6,260,008 B1 | 7/2001 | Sanfilippo |
| 6,278,969 B1 | 8/2001 | King et al. |
| 6,285,978 B1 | 9/2001 | Bernth et al. |
| 6,301,574 B1 | 10/2001 | Thomas et al. |
| 6,304,846 B1 | 10/2001 | George et al. |
| 6,338,033 B1 | 1/2002 | Bourbonnais et al. |
| 6,341,372 B1 | 1/2002 | Datig |
| 6,345,244 B1 * | 2/2002 | Clark ............................ 704/2 |
| 6,345,245 B1 | 2/2002 | Sugiyama et al. |
| 6,347,316 B1 | 2/2002 | Redpath |
| 6,353,824 B1 | 3/2002 | Boguraev et al. |
| 6,393,389 B1 | 5/2002 | Chanod et al. |
| 6,401,105 B1 | 6/2002 | Carlin et al. |
| 6,442,524 B1 | 8/2002 | Ecker et al. |
| 6,470,306 B1 | 10/2002 | Pringle et al. |
| 6,473,729 B1 | 10/2002 | Gastaldo et al. |
| 6,526,426 B1 | 2/2003 | Lakritz |
| 6,623,529 B1 | 9/2003 | Lakritz |
| 6,658,627 B1 | 12/2003 | Gallup et al. |
| 6,687,671 B2 | 2/2004 | Gudorf et al. |
| 6,731,625 B1 | 5/2004 | Eastep et al. |
| 6,952,691 B2 | 10/2005 | Drissi et al. |
| 6,993,473 B2 | 1/2006 | Cartus |
| 7,020,601 B1 | 3/2006 | Hummel et al. |
| 7,194,403 B2 | 3/2007 | Okura et al. |
| 7,209,875 B2 | 4/2007 | Quirk et al. |
| 7,266,767 B2 | 9/2007 | Parker |
| 7,343,551 B1 | 3/2008 | Bourdev |
| 7,353,165 B2 | 4/2008 | Zhou et al. |
| 7,533,338 B2 | 5/2009 | Duncan et al. |
| 7,580,960 B2 | 8/2009 | Travieso et al. |
| 7,587,307 B2 | 9/2009 | Cancedda et al. |
| 7,594,176 B1 | 9/2009 | English |
| 7,983,896 B2 | 7/2011 | Ross et al. |
| 8,050,906 B1 | 11/2011 | Zimmerman et al. |
| 2002/0093416 A1 | 7/2002 | Goers |
| 2002/0099547 A1 | 7/2002 | Chu et al. |
| 2002/0103632 A1 | 8/2002 | Dutta et al. |
| 2002/0111787 A1 | 8/2002 | Knyphausen et al. |
| 2002/0165708 A1 | 11/2002 | Kumhyr |
| 2002/0169592 A1 | 11/2002 | Aityan |
| 2002/0198701 A1 | 12/2002 | Moore |
| 2003/0004702 A1 | 1/2003 | Higinbotham |
| 2003/0016147 A1 | 1/2003 | Evans |
| 2003/0069879 A1 | 4/2003 | Sloan et al. |
| 2003/0105621 A1 | 6/2003 | Mercier |
| 2003/0120479 A1 | 6/2003 | Parkinson et al. |
| 2003/0158723 A1 | 8/2003 | Masuichi et al. |
| 2003/0182279 A1 | 9/2003 | Willows |
| 2003/0233222 A1 | 12/2003 | Soricut et al. |
| 2004/0122656 A1 | 6/2004 | Abir |
| 2004/0172235 A1 | 9/2004 | Pinkham et al. |
| 2005/0021323 A1 | 1/2005 | Li |
| 2005/0171758 A1 | 8/2005 | Palmquist |
| 2005/0197827 A1 | 9/2005 | Ross |
| 2005/0222837 A1 | 10/2005 | Deane |
| 2005/0273314 A1 | 12/2005 | Chang |
| 2006/0015320 A1 | 1/2006 | Och |
| 2006/0136277 A1 | 6/2006 | Perry |
| 2006/0256139 A1 | 11/2006 | Gikandi |
| 2007/0136470 A1 | 6/2007 | Chikkareddy |
| 2007/0150257 A1 | 6/2007 | Cancedda |
| 2007/0192110 A1 | 8/2007 | Mizutani et al. |
| 2007/0233460 A1 | 10/2007 | Lancaster et al. |
| 2007/0233463 A1 | 10/2007 | Sparre |
| 2008/0077395 A1 | 3/2008 | Lancaster |
| 2008/0243834 A1 | 10/2008 | Rieman et al. |
| 2008/0294982 A1 | 11/2008 | Leung et al. |
| 2009/0204385 A1 | 8/2009 | Cheng |
| 2009/0248482 A1 | 10/2009 | Knyphausen et al. |
| 2010/0223047 A1 | 9/2010 | Christ |
| 2010/0262621 A1 | 10/2010 | Ross |
| 2011/0184719 A1 | 7/2011 | Christ |
| 2012/0095747 A1 | 4/2012 | Ross |

FOREIGN PATENT DOCUMENTS

| | | |
|---|---|---|
| EP | 0887748 | 12/1998 |
| EP | 2226733 | 9/2010 |
| GB | 2433403 | 6/2007 |
| JP | 04152466 | 5/1992 |
| JP | 05135095 | 6/1993 |

(56) References Cited

FOREIGN PATENT DOCUMENTS

| | | |
|---|---|---|
| JP | 05197746 | 8/1993 |
| JP | 06035962 | 2/1994 |
| JP | PO6259487 | 9/1994 |
| JP | 07093331 A2 | 4/1995 |
| JP | 08055123 | 2/1996 |
| JP | 9-114907 | 5/1997 |
| JP | 10-063747 | 3/1998 |
| JP | 10097530 | 4/1998 |
| JP | 2003150623 | 5/2003 |
| JP | 2004318510 | 11/2004 |
| JP | 2005107597 | 4/2005 |
| JP | 20050197827 | 7/2005 |
| JP | 2007249606 | 9/2007 |
| JP | 2008152670 | 7/2008 |
| WO | WO9406086 | 3/1994 |
| WO | WO9957651 | 11/1999 |
| WO | WO0101289 | 1/2001 |
| WO | WO0129696 | 4/2001 |
| WO | WO0229622 | 4/2002 |
| WO | WO2006016171 | 2/2006 |
| WO | WO2008055360 | 5/2008 |
| WO | WO2008083503 | 7/2008 |
| WO | WO2008147647 | 12/2008 |

OTHER PUBLICATIONS

Notification of Reasons for Refusal for Japanese Application No. 2000-607125 mailed on Nov. 10, 2009. (Abstract only).
Komatsu, H et al, "Corpus-based predictive text input", "Proceedings of the 2005 International Conference on Active Media Technology", 2005, IEEE, pp. 75-80, ISBN 0-7803-9035-0.
Saiz, Jorge Civera: "Novel statistical approaches to text classification, machine translation and computer-assisted translation" Doctor En Informatica Thesis, May 22, 2008, XP002575820 Universidad Polit'ecnica de Valencia, Spain. Retrieved from Internet: http://dspace.upv.es/manakin/handle/10251/2502 [retrieved on Mar. 30, 2010]. page 111-131.
De Gispert, A., Marino, J.B. and Crego, J.M.: "Phrase-Based Alignment Combining Corpus Cooccurrences and Linguistic Knowledge" Proc. of the Int. Workshop on Spoken Language Translation (IWSLT'04), Oct. 1, 2004, XP002575821 Kyoto, Japan. Retrieved from the Internet: http://mi.eng.cam.ac.uk/~ad465/agispert/docs/papers/TP_gispert.pdf [retrieved on Mar. 30, 2010].
Planas, Emmanuel: "SIMILIS Second-generation translation memory software," Translating and the Computer 27, Nov. 2005 [London: Aslib, 2005].
Ross et al., U.S. Appl. No. 11/071,706, filed Mar. 3, 2005, Office Communication dated Jun. 9, 2009.
Ross et al., U.S. Appl. No. 11/071,706, filed Mar. 3, 2005, Office Communication dated Feb. 18, 2010.
Ross et al., U.S. Appl. No. 11/071,706, filed Mar. 3, 2005, Office Communicaiton dated Feb. 18, 2010.
Colucci, Office Communication for U.S. Appl. No. 11/071,706 dated Sep. 24, 2010,
Och, et al., "Improved Alignment Models for Statistical Machine Translation," In: Proceedings of the Joint Workshop on Empirical Methods in NLP and Very Large Corporations, 1999, p. 20-28, downloaded from http://www.actweb.org/anthology-new/W/W99/W99-0604.pdf.
XP 002112717—Machine translation software for the Internet, Harada K.; et al, vol. 28, Nr:2, pp. 66-74. Sanyo Technical Review—San'yo Denki Giho, 19961001 Hirakata, JP—ISSN 0285-516X.
XP 002565038—Integrating Machine Translation into Translation Memory Systems, Matthias Heyn, pp. 113-126, TKE. Terminology and Knowledge Engineering. Proceedingsinternational Congress on Terminology and Knowledge Engineering, 19960829; 19960829-19960830 XX, XX.
XP 002565039—Linking translation memories with example-based machine translation, Michael Carl; Silvia Hansen, pp. 617-624, Machine Translation Summit. Proceedings, 19990901.
XP 55024828—TransType2—An Innovative Computer-Assisted Translation System, ACL 2004, Jul. 21, 2004, Retrieved from the Internet :http://www.mt-archive.info/ACL-2004-Esteban.pdf [retrieved on Apr. 18, 2012].
Bourigault, Surface Grammatical Analysis for the Extraction of Terminological Noun Phrases, Proc. of Coling-92, Aug. 23, 1992, pp. 977-981, Nantes, France.
Thurmair, Making Term Extraction Tools Usable, The Joint Conference of the 8th International Workshop of the European Association for Machine Translation, May 15, 2003, Dublin, Ireland.
Sanfillipo, Section 5.2 Multiword Recognition and Extraction, Eagles LE3-4244, Preliminary Recommendations on Lexical Semantic Encoding, Jan. 7, 1999.
Hindle et al., Structural Ambiguity and lexical Relations, 1993, Association for Computational Linguistics, vol. 19, No. 1, pp. 103-120.
"Ratnaparkhi, A Maximum Entropy Model for Part-of-Speech Tagging, 1996, Proceedings of the conference on empirical methods in natural language processing, V.1, pp. 133-142".
International Search Report and Written Opinion dated Sep. 4, 2007 in Application No. PCT/US06/17398.
XP 000033460—Method to Make a Translated Text File Have the Same Printer Control Tags as the Original Text File, vol. 32, Nr:2, pp. 375-377, IBM Technical Disclosure Bulletin, 19890701 International Business Machines Corp. (Thornwood), US—ISSN 0018-8689.
Web Page—New Auction Art Preview, www.netauction.net/dragonart.html, "Come bid on original illustrations," by Greg & Tim Hidebrandt.
Web Pages—BidNet, www.bidnet.com, "Your link to the State and Local Government Market," including Bid Alert Service.
Web Pages—Christie's Art, www.christies.com, including "How to Buy," and "How to Sell."
Web pages—Artrock Auction, www.commerce.com, Auction Gallery.
Trados Translator's Workbench for Windows, 1994-1995, Trados GbmH, Stuttgart, Germany, pp. 9-13 and 27-96.
XP 002112717—Machine translation software for the Internet, Harada K.; et al, vol. 28, Nr:2, pp. 66-74. Sanyo Technical Review—San'yo Denki Giho, Hirakata, JP—ISSN 0285-516X, Oct. 1, 1996.
XP 002565038—Integrating Machine Translation into Translation Memory Systems, Matthias Heyn, pp. 113-126, TKE. Terminology and Knowledge Engineering. Proceedingsinternational Congress on Terminology and Knowledge Engineering, Aug. 29-30, 1996.
XP 002565039—Linking translation memories with example-based machine translation, Michael Carl; Silvia Hansen, pp. 617-624, Machine Translation Summit. Proceedings, Sep. 1, 1999.
XP 000033460—Method to Make a Translated Text File Have the Same Printer Control Tags as the Original Text File, vol. 32, Nr:2, pp. 375-377, IBM Technical Disclosure Bulletin, International Business Machines Corp. (Thornwood), US—ISSN 0018-8689, Jul. 1, 1989.
Web Page—New Auction Art Preview, www.netauction.net/dragonart.html, "Come bid on original illustrations," by Greg & Tim Hidebrandt, Feb. 3, 2001. (last accessed Nov. 16, 2011).
Web Pages—BidNet, www.bidnet.com, "Your link to the State and Local Government Market," including Bid Alert Service, Februray 7, 2009. (last accessed Nov. 16, 2011).
Web Pages - Christie's Art, www.christies.com, including "How to Buy," and "How to Sell," Apr. 23, 2009. (last accessed Nov. 16, 2011).
Web Pages—Artrock Auction, www.commerce.com, Auction Gallery, Apr. 7, 2007. (last accessed Nov. 16, 2011).
Somers, H. "Review Article: Example-based Machine Translation," Machine Translation, Issue 14, pp. 113-157, 1999.
Civera, et al. "Computer-Assisted Translation Tool Based on Finite-State Technology," In: Proc. of EAMT, 2006, pp. 33-40 (2006).
Okura, Seiji, "Translation Assistance by Autocomplete," The Association for Natural Language Processing, Publication 13th Annual Meeting, Mar. 2007, p. 678-679.
Soricut, R, et al., "Using a Large Monolingual Corpus to Improve Translation Accuracy," Proc. of the Conference of the Association for Machine Translation in the Americas (Amta-2002), Aug. 10, 2002, pp. 155-164, XP002275656.

(56) References Cited

OTHER PUBLICATIONS

Fung et al. "An IR Approach for Translating New Words from Nonparallel, Comparable Texts," Proceeding COLING '998 Proceedings of the 17th International Conference on Computational Lingiustics, 1998.
First Office Action mailed Dec. 26, 2008 in Chinese Patent Application 200580027102.1, filed Aug. 11, 2005.
Second Office Action mailed Aug. 28, 2009 in Chinese Patent Application 200580027102.1, filed Aug. 11, 2005.
Third Office Action mailed Apr. 28, 2010 in Chinese Patent Application 200580027102.1, filed Aug. 11, 2005.
Summons to attend oral proceeding pursuant to Rule 115(1)(EPC) mailed Mar. 20, 2012 in European Patent Application 05772051.8 filed Aug. 11, 2005.
Notification of Reasons for Rejection mailed Jan. 9, 2007 for Japanese Patent Application 2000-547557, filed Apr. 30, 1999.
Decision of Rejection mailed Jul. 3, 2007 for Japanese Patent Application 2000-547557, filed Apr. 30, 1999.
Extended European Search Report and Written Opinion mailed Jan. 26, 2011 for European Patent Application 1089145.5, filed on Oct. 27, 2010.
Notice of Reasons for Rejection mailed Jun. 26, 2012 for Japanese Patent Application P2009-246729. filed Oct. 27, 2009.
Search Report mailed Jan. 22, 2010 for United Kingdoms Application GB0918765.9, filed Oct. 27, 2009.
Notice of Reasons for Rejection mailed Mar. 30, 2010 for Japanese Patent Application 2007-282902. filed Apr. 30, 1999.
Decision of Rejection mailed Mar. 15, 2011 for Japanese Patent Application 2007-282902, filed Apr. 30, 1999.
First Office Action mailed Oct. 18, 2011 for Chinese Patent Application 2009102531926, filed Dec. 14, 2009.
Second Office Action mailed Aug. 14, 2012 for Chinese Patent Application 2009102531926, filed Dec. 14, 2009.
European Search Report mailed Apr. 12, 2010 for European Patent Application 09179150, filed Dec. 14, 2009.
First Examination Report mailed Jun. 16, 2011 for European Patent Application 09179150, filed Dec. 14, 2009.
Notice of Reasons for Rejection mailed Jul. 31, 2012 for Japanese Patent Application 2010-45531, filed Mar. 2, 2010.
First Examination Report mailed Oct. 26, 2012 for United Kingdom Patent Application 0903418.5, filed Mar. 2, 2009.
First Office Action mailed Jun. 19, 2009 for Chinese Patent Application 200680015388.6, filed May 8, 2006.
First Examination Report mailed Nov. 26, 2009 for European Patent Application 05772051.8, filed May 8, 2006.
Second Examination Report mailed Feb. 19, 2013 for European Patent Application 05772051.8, filed May 8, 2006.
Langlais, et al. "TransType: a Computer-Aided Translation Typing System", in Conference on Language Resources and Evaluation, 2000.
First Notice of Reasons for Rejection mailed Jun. 18, 2013 for Japanese Patent Application 2009-246729, filed Oct. 27, 2009.
First Notice of Reasons for Rejection mailed Jun. 4, 2013 for Japanese Patent Application 2010-045531, filed Oct. 27, 2009.
Rejection Decision mailed May 14, 2013 for Chinese Patent Application 200910253192.6, filed Dec. 14, 2009.
Matsunaga, et al. "Sentence Matching Algorithm of Revised Documents with Considering Context Information," IEICE Technical Report, 2003.

* cited by examiner

NEW PROJECT REQUEST FORM

| | PROJECT SPECIFICS | | |
|---|---|---|---|
| 302 | FILENAME | | |
| 304 | SOURCE LANGUAGE | ENGLISH ▼ | 330 |
| 306 | TARGET LANGUAGE | GERMAN ▼ | 332 |
| 308 | SUBJECT MATTER | AUTOMOTIVE ▼ | 334 |
| 310 | INVITE TRANSLATORS | | 336 |
| 312 | COUNTRY OF RESIDENCE | USA ▼ | 338 |
| 314 | TRANSLATOR GROUP | --- ALL --- ▼<br>TRANSLATOR GROUPS | 340 |
| 316 | BIDDING PROCESS | | |
| 318 | MAXIMUM PRICE | 300 $ | 342 |
| 320 | MAXIMUM # OF BIDDERS | NO LIMIT ▼ | 344 |
| 322 | AWARD METHOD | ◉ AUTOMATIC  ○ MANUAL | 346 |
| 324 | AWARD DATE | DATE [          ]<br>TIME [          ] | 348 |
| 326 | AWARD PREFERENCE | ◉ BEST PRICE<br>○ EARLIEST DELIVERY DATE<br>○ FIRST BIDDER | 350 |

328 [ UPLOAD FILE AND START PROJECT ]

FIG. 3

BIDDING FOR PROJECT TZ001

| FILE NAME | 402 | SOURCE LANGUAGE | 404 | TARGET LANGUAGE | 406 | SUBJECT MATTER | 408 |
|---|---|---|---|---|---|---|---|
| CONTRACT.DOC | | ENGLISH | | GERMAN | | LEGAL | |
| TOTAL # OF WORDS | 410 | TOTAL # TUs | 412 | # OF RECYCLED TUs | 414 | # OF NEW WORDS | 416 |
| 32,336 | | 4,211 | | 482 | | 27,298 | |
| END OF BIDDING | 418 | DATE OF DELIVERY | 420 | MAXIMUM PRICE | 422 | AWARD CRITERION | 424 |
| 25/1/99 | | 28/2/99 | | 3,500 $ | | PRICE | |
| AWARD DECISION | 426 | MAXIMUM # OF BIDS | 428 | STATUS | 430 | BEST OFFER | 432 |
| AUTOMATIC | | NO LIMIT | | OPEN - 3 BIDS | | 3000 $ | |

FIG. 4A

| DELIVERY DATE | MY BEST PRICE | ESTIMATED # OF TUs RECYCLED | ESTIMATED ROYALTIES TO PAY TO OTHER TRANSLATORS | 10% COMMISSION TO TRANSLATION ZONE | ESTIMATED INCOME |
|---|---|---|---|---|---|
| 27/2/99 | 2,900 $ | 482 | 48.20 $ | 290.00 $ | 2,561,80 $ |

SUBMIT OFFER

FIG. 4B

TRANSACTION HISTORY

| DATE | TIME | ACTOR | ACTIVITY/ACTION | DATA |
|---|---|---|---|---|
| 21/1/99 | 14:01 | TRADOS GmbH | UPLOAD | CONTRACT.DOC |
| 21/1/99 | 14:01 | CLEARINGHOUSE | CREDIT CHECK MAX PRICE | 3,500 |
| 21/1/99 | 14:02 | TRADOS GmbH | AUTHORIZES 50% DOWN PAYMENT | 1,750 |
| 21/1/99 | 14:02 | CLEARINGHOUSE | PRE-TRANSLATE | 482 TUs |
| 21/1/99 | 14:05 | CLEARINGHOUSE | START BIDDING | 20 INVITES |
| 22/1/99 | 10:23 | TRACY TRANSLATOR | SUBMITS BID | 2,900 |
| 25/1/99 | 12:00 | CLEARINGHOUSE | AWARDS | PRICE |
| 1/2/99 | 9:31 | TRACY TRANSLATOR | UPLOADS | CONTRACT-D.DOC |
| 1/2/99 | 9:32 | CLEARINGHOUSE | NOTIFIED | TRADOS GmbH |
| 1/2/99 | 14:12 | TRADOS GmbH | PREVIEWS | CONTRACT-D.DOC |
| 1/2/99 | 14:18 | TRADOS GmbH | DOWNLOADS | CONTRACT-D.DOC |
| 1/2/99 | 14:20 | CLEARINGHOUSE | UPDATES TM | 1400 NEW UNITS 392 OLD UNITS |
| 1/2/99 | 14:22 | CLEARINGHOUSE | CREDITS ROYALTIES | $39.20 |
| 1/2/99 | 14:36 | CLEARINGHOUSE | CREDITS TO TRACY TRANSLATOR | $2,570 |

FIG. 4C

TRANSLATOR'S HOME

WELCOME BACK! SINCE YOUR LAST VISIT, PEOPLE HAVE BEEN BUSY. YOU ARE INVITED TO PARTICIPATE IN 6 CALLS FOR TENDER, CURRENTLY AUCTIONED OFF IN THE BIDDING MODULE. PLEASE DON'T FORGET YOUR CURRENT PROJECTS IN PROGRESS. THE FIRST ONE OF THEM IS DUE BY JAN. 25TH, 1999. ALSO, THERE ARE 2 NEWLY AWARDED PROJECTS WAITING TO BE DOWNLOADED.

| | | |
|---|---|---|
| 502 | NUMBER OF PROJECTS YOU HAVE TRANSLATED | 213 |
| 504 | NUMBER OF PROJECTS IN PROGRESS (THAT YOU ARE CURRENTLY WORKING ON) | 3 |
| 506 | NUMBER OF PROJECTS IN BIDDING (YOU ARE INVITED TO SUBMIT AN OFFER) | 6 |
| 508 | TOTAL AMOUNT OF TRANSLATION UNITS RECYCLED IN YOUR PROJECTS | 701 |
| 510 | TOTAL NUMBER OF TRANSLATION UNITS YOU OWN | 331 |
| 512 | NUMBER OF YOUR TRANSLATION UNITS REUSED OTHER TRANSLATORS | 1200 |
| 514 | TOTAL AMOUNT EARNED ON ROYALTIES FROM YOUR TRANSLATION UNITS | $600.00 |
| 518 | YOUR CURRENT BALANCE (WHAT THE CLEARINGHOUSE OWES YOU) | $2,400 |
| 520 | NUMBER OF PROJECTS AWARDED TO YOU SINCE LAST TIME YOU VISITED | 2 |

FIG. 5

OPERATOR REGISTRATION

| | | |
|---|---|---|
| 702 | COMPANY NAME | |
| 704 | LAST NAME | |
| 706 | FIRST NAME | |
| 708 | STREET | |
| 710 | CITY | |
| 712 | STATE, ZIP | |
| 714 | EMAIL | |
| 716 | TELEPHONE | |
| 718 | CREDIT CARD (IF YOU WANT TO BE CREDITED INSTEAD OF RECEIVING MONTHLY CHECKS) | ◉ AMEX ○ VISA ○ MASTER<br>NUMBER... [ ]<br>EXPIRATION [ ]  730 |
| 720 | SOURCE LANGUAGES | ENGLISH<br>GERMAN<br>FRENCH       732<br>SPANISH<br>PORTUGUESE |
| 722 | TARGET LANGUAGES | ENGLISH ▼<br>ENGLISH ▼  734 |
| 724 | SUBJECT AREAS | AUTOMOTIVE<br>AEROSPACE<br>ENGINEERING   736<br>COMPUTER<br>SOFTWARE |
| 726 | COUNTRY OF RESIDENCE | USA ▼  738 |

728 [ REGISTER ]

FIG. 7

SUBJECT REGISTRATION

| 902 | COMPANY NAME | |
|---|---|---|
| 904 | LAST NAME | |
| 906 | FIRST NAME | |
| 908 | STREET | |
| 910 | CITY | |
| 912 | STATE, ZIP | |
| 914 | EMAIL | |
| 916 | TELEPHONE | |
| 918 | CREDIT CARD | ◉ AMEX ○ VISA ○ MASTER<br>NUMBER...<br>EXPIRATION | 930 |

928 REGISTER

FIG. 9

TRANSLATOR GROUPS

| SOURCE LANGUAGE | TARGET LANGUAGE | SUBJECT MATTER |
|---|---|---|
| ENGLISH ▼ | ENGLISH ▼ | AEROSPACE ▼ |
| INCLUDE | NAME | # WORDS |
| ☐ | MAYER, CHRIS | 72,121 |
| ☐ | MILLER, BEATRICE | 321,214 |
| ☐ | MUELLER, HANS | 2,301 |
| ☐ | NERUDA, PABLO | 1,209,201 |
| ☐ | SMITH, RON | 2,210,298 |
| ☐ | SMITH, SUSAN | 1,136,892 |

| UPDATE USER-DEFINED |
|---|

FIG. 13

SUBJECT'S HOME

WELCOME BACK! SINCE YOUR LAST VISIT, PEOPLE HAVE BEEN BUSY. THERE ARE PROJECTS OF YOURS CURRENTLY BEING AUCTIONED OFF. PLEASE DON'T FORGET YOUR CURRENT PROJECTS IN PROGRESS. THE FIRST ONE OF THEM IS DUE BACK BY JAN. 25TH, 1999. AND THERE ARE 2 NEWLY AWARDED PROJECTS OF YOURS WAITING TO BE DOWNLOADED BY THE RESPECTIVE TRANSLATOR.

| | | |
|---|---|---|
| 1502 | NUMBER OF PROJECTS YOU HAD TRANSLATED | 21 |
| 1504 | NUMBER OF PROJECTS IN PROGRESS (THAT TRANSLATORS ARE CURRENTLY WORKING ON) | 2 |
| 1506 | NUMBER OF PROJECTS IN BIDDING (WAITING TO BE AWARDED) | 1 |
| 1508 | TOTAL AMOUNT OF TRANSLATION UNITS IN ALL YOUR PROJECTS | 17211 |
| 1510 | TOTAL NUMBER OF TRANSLATION UNITS RECYCLED | 1331 |
| 1512 | NUMBER OF RECYCLED WORDS IN THESE TRANSLATION UNITS | 12027 |
| 1514 | ESTIMATED SAVINGS AT AN AVERAGE PRICE OF 15 CENTS/WORD | $1,804.05 |
| 1516 | YOUR CURRENT BALANCE (WHAT YOU OWE) | $1,500 |
| 1518 | NUMBER OF PROJECTS FINISHED AND WAITING FOR YOU TO BE DOWNLOADED | 2 |

FIG. 15

TRANSLATION BIDDING POOL

HERE YOU CAN SEE ALL PROJECTS THAT ARE CURRENTLY OPEN FOR BIDDING.

IF YOU WANT TO SEE ALL THE CURRENT OFFERS FOR A SPECIFIC PROJECT, CLICK ON A PROJECT NAME.

| 1602 | 1604 | 1606 | 1608 | 1610 | 1612 | 1614 | 1616 | 1618 | 1620 | 1622 | 1624 |
|---|---|---|---|---|---|---|---|---|---|---|---|
| PROJECT ID | SOURCE LANGUAGE | TARGET LANGUAGE | SUBJECT MATTER | TOTAL # OF WORDS | # OF TUs | # OF TUs RECYCLED | END OF BIDDING | DELIVERY DATE | AWARD CRITERION | BEST OFFER | STATUS |
| TZ001 | ENGLISH | GERMAN | LEGAL | 32,336 | 4,211 | 482 | 25/1/99 | 28/2/99 | PRICE | 3,000 | OPEN 3 |
| TZ009 | FRENCH | GERMAN | LEGAL | 2,736 | 271 | 42 | 22/1/99 | 28/2/99 | FIRST | -- | OPEN |
| TZ021 | ENGLISH | GERMAN | COMPUTER | 320,443 | 40,421 | 8,231 | 25/1/99 | 15/4/99 | MANUAL/PRICE | 28,000 | OPEN 5 |

FIG. 16

PROJECT IN PROGRESS (SUBJECT'S VIEW)

| TRANSLATOR'S NAME | PROJECT ID | FILE NAME | START BIDDING | AWARD DATE | DELIVERY DATE | CYCLE | NEW DELIVERY | STATUS | NEXT ACTION |
|---|---|---|---|---|---|---|---|---|---|
| PABLO NERUDA | TZ001 | CONTRACT.DOC | 21/01/99 | 25/01/99 | 11/2/1999 | 1 | -- | UPLOADED | ACCEPT FIX IT DENY |
| CHRIS MEYER | TZ021 | 3270INTRO.DOC | 22/01/99 | 25/01/99 | 28/2/99 | 1 | -- | AWARDED | DOWNLOAD BY CHRIS |
| BEATRICE MILLER | TZ009 | VERTRAG.DOC | 9/12/98 | 22/1/99 | 28/2/99 | 1 | -- | AWARDED | DOWNLOAD BY BEATRICE |

ONE TRANSLATION PROJECT HAS BEEN FINISHED FOR YOU. PLEASE CONFIRM YOUR ACCEPTANCE BY CLICKING ON ACCEPT IN THE NEXT ACTION FIELD. NOTE, THAT THE STATUS WILL CHANGE FROM "UPLOADED" TO "PAID IN FULL." IF YOU DON'T ACCEPT, AFTER READING RANDOM EXCERPTS OF THE TRANSLATION WORK, YOU CAN ISSUE A "FIX-IT" REQUEST TO THE TRANSLATOR.

IF YOU AS A SUBJECT ARE NOT SATISFIED WITH THE TRANSLATION, YOU HAVE THREE OPTIONS:

1. YOU MAY REJECT THE WORK ENTIRELY BY CLICKING ON ACCEPT IN THE NEXT ACTION FIELD. IN THAT CASE THE TRANSLATOR MAY ONLY RECEIVE 50% OF THE ORIGINAL CONTRACT AMOUNT. THE WORK PRODUCT REFUSAL MAY BE NOTED IN THE CREDENTIAL CHECK MODULE, AND YOU WILL BE UNABLE TO USE THE TRANSLATION.
2. YOU MAY FILE A FIX-IT REQUEST, BY CLICKING ON ACCEPT IN THE NEXT ACTION FIELD AND STATING THE REASONS FOR REJECTING THE PROJECT. YOU WILL HAVE TO SET A NEW DELIVERY DATE. YOU MAY ASK FOR A SERVICE CHARGE REDUCTION. A WHOLE NEW WORK CYCLE WILL START.
IF YOU AND THE TRANSLATOR HAVE NOT COME TO TERMS AFTER THREE FIT-IT CYCLES, THE SYSTEM WILL EITHER CLOSE THE PROJECT AND FILE IT AS PAID IN HALF, OR IF A LARGER SUM IS AT STAKE, ESCALATE THE CASE TO THE ARBITRATION BOARD.
3. IN CASE OF ANY SEVERE BUSINESS MISCONDUCT, YOU MAY CALL THE ARBITRATION BOARD IMMEDIATELY. THE BOARD MAY THEN HEAR BOTH SIDES AND SUGGEST A REMEDY.

FIG. 17

PROJECT IN PROGRESS (OPERATOR'S VIEW)

| SUBJECT'S NAME | PROJECT ID | FILE NAME | START BIDDING | AWARD DATE | DELIVERY DATE | CYCLE | NEW DELIVERY | STATUS | NEXT ACTION |
|---|---|---|---|---|---|---|---|---|---|
| TRADOS | TZ001 | CONTRACT.DOC | 21/01/99 | 25/01/99 | 11/2/1999 | 1 | -- | TRANSLATE | UPLOAD |
| IBM | TZ002 | 3270INTRO.DOC | 22/01/99 | 26/01/99 | 28/2/99 | 1 | -- | TRANSLATE | UPLOAD |
| SIEMENS | TZ005 | REPORT.DOC | 9/12/98 | 12/12/98 | 25/1/99 | 1 | | UPLOADED | ACCEPT BY CLIENT |
| GM | TZ027 | REPAIR.DOC | 23/12/98 | 23/12/98 | 18/1/99 | 2 | 28/1/99 | UPLOADED | ACCEPT BY CLIENT |

ONCE YOU HAVE COMPLETED YOUR TRANSLATION, CLICK ON UPLOAD. IF THE SYSTEM VERIFIES A SUCCESSFUL UPLOAD, THE SUBJECT WILL BE NOTIFIED TO RECEIVE AND ACCEPT THE TRANSLATION. IF EVERYTHING GOES WELL, YOU WILL BE CREDITED YOUR SERVICE CHARGE. THE PROJECT STATUS WILL CHANGE TO PAID IN FULL, AND THE PROJECT WILL BE SHUFFLED TO THE PROJECT HISTORY SCREEN.

IF THE SUBJECT IS NOT SATISFIED WITH YOUR TRANSLATION, HE HAS THREE OPTIONS:

1. THE SUBJECT MAY REJECT THE WORK ENTIRELY. IN THAT CASE YOU MAY ONLY RECEIVE 50% OF THE ORIGINAL SUM. THERE IS NO REMEDY OTHER THAN "THE FACT WILL GO ON RECORD", AND THAT HE IS UNABLE TO USE YOUR WORK.
2. THE SUBJECT MAY FILE A FIX-IT REQUEST, STATING HIS REASONS FOR REJECTING YOUR WORK AS IT IS. HE WILL ALSO HAVE TO SET A NEW DELIVERY DATE. HE MAY ASK FOR A SERVICE CHARGE REDUCTION. A WHOLE NEW WORK CYCLE GETS STARTED. YOU DO NOT HAVE TO ACCEPT HIS FIX-IT REQUEST. YOU MAY REJECT THE FIX IT REQUEST. IF YOU AND THE SUBJECT HAVE NOT COME TO TERMS AFTER THREE FIX-IT CYCLES, THE SYSTEM WILL EITHER CLOSE THE PROJECT AND FILE IT AS PAID IN HALF, OR IF A LARGER SUM IS AT STAKE, ESCALATE THE CASE TO THE ARBITRATION BOARD.
3. THE SUBJECT MAY CALL THE ARBITRATION BOARD IMMEDIATELY, WITHOUT FURTHER ADO, IN CASE OF ANY SEVERE BUSINESS MISCONDUCT. THE BOARD MAY THEN HEAR BOTH SIDES AND SUGGEST A REMEDY.

FIG. 18A

PROJECT IN PROGRESS (OPERATOR'S VIEW)

| SUBJECT'S NAME | PROJECT ID | FILE NAME | START BIDDING | AWARD DATE | DELIVERY DATE | CYCLE | NEW DELIVERY | STATUS | NEXT ACTION |
|---|---|---|---|---|---|---|---|---|---|
| TRADOS | TZ001 | CONTRACT.DOC | 21/01/99 | 25/01/99 | 11/2/1999 | 1 | -- | AWARDED | DOWNLOAD |
| IBM | TZ002 | 3270INTRO.DOC | 22/01/99 | 26/01/99 | 28/2/99 | 1 | -- | AWARDED | DOWNLOAD |
| SIEMENS | TZ005 | REPORT.DOC | 9/12/98 | 12/12/98 | 25/1/99 | 1 | -- | TRANSLATE | UPLOAD |
| GM | TZ027 | REPAIR.DOC | 23/12/98 | 23/12/98 | 18/1/99 | 2 | 28/1/99 | FIXING | UPLOAD |

THERE HAVE BEEN 2 NEW TRANSLATION PROJECTS AWARDED TO YOU. PLEASE CONFIRM YOUR ACCEPTANCE BY CLICKING ON DOWNLOAD IN THE NEXT ACTION FIELD. NOTE, THAT THE STATUS WILL CHANGE FROM AWARDED TO TRANSLATE, AND NEXT ACTION WILL CHANGE FROM DOWNLOAD TO UPLOAD. SHOULD YOU EVER NEED TO DOWNLOAD THE ORIGINAL FILE AGAIN, YOU CAN ALWAYS DO SO BY CLICKING ON THE PROJECT ID.

ONCE YOU HAVE COMPLETED YOUR TRANSLATION, CLICK ON UPLOAD. AFTER THE SYSTEM VERIFIES A SUCCESSFUL UPLOAD, THE SUBJECT WILL BE NOTIFIED TO RECEIVE AND ACCEPT THE TRANSLATION. IF EVERYTHING GOES WELL, YOU WILL BE CREDITED YOUR SERVICE CHARGE. THE PROJECT STATUS WILL CHANGE TO PAID IN FULL, AND THE PROJECT DETAILS WILL BE SHUFFLED TO THE PROJECT HISTORY SCREEN.

IF THE SUBJECT IS NOT SATISFIED WITH YOUR TRANSLATION, HE HAS THREE OPTIONS:

1. THE SUBJECT MAY REJECT THE WORK ENTIRELY. IN THAT CASE YOU MAY ONLY RECEIVE 50% OF THE ORIGINAL SUM. THERE IS NO REMEDY OTHER THAN "THE FACT WILL GO ON RECORD", AND THAT HE IS UNABLE TO USE YOUR WORK.
2. THE SUBJECT MAY FILE A FIX-IT REQUEST. HE MAY ASK FOR A SERVICE CHARGE REDUCTION, STATING HIS REASONS FOR REJECTING YOUR WORK AS IT IS. HE WILL ALSO HAVE TO SET A NEW DELIVERY DATE. HE MAY ASK FOR A SERVICE CHARGE REDUCTION. A WHOLE NEW WORK CYCLE GETS STARTED. YOU DO NOT HAVE TO ACCEPT HIS FIX-IT REQUEST. YOU MAY REJECT THE FIX-IT REQUEST. IF YOU AND THE SUBJECT HAVE NOT COME TO TERMS AFTER THREE FIX-IT CYCLES, THE SYSTEM WILL EITHER CLOSE THE PROJECT AND FILE IT AS PAID IN HALF, OR IF A LARGER SUM IS AT STAKE, ESCALATE THE CASE TO THE ARBITRATION BOARD.
3. THE SUBJECT MAY CALL THE ARBITRATION BOARD IMMEDIATELY, WITHOUT FURTHER ADO, IN CASE OF ANY SEVERE BUSINESS MISCONDUCT. THE BOARD MAY THEN HEAR BOTH SIDES AND SUGGEST A REMEDY.

FIG. 18B

TRANSLATOR'S BIDDING

WELCOME. HERE YOU CAN SEE ALL PROJECTS THAT ARE CURRENTLY OPEN FOR A CALL FOR TENDER AND THAT YOU ARE INVITED TO SUBMIT A BID.

BEFORE MAKING YOUR BID, YOU WILL BE ABLE TO SEE A PREVIEW OF THE CONTENT, AS WELL AS QUANTITIVE INFORMATION SUCH AS HOW MANY WORDS ARE IN THE DOCUMENT, HOW MANY SEGMENTS COULD BE PRE-TRANSLATED USING THE TRANSLATION MEMORY, ETC.

IF YOU ARE CONSIDERING SUBMITTING A BID OFFER, CLICK ON A PROJECT NAME TO PREVIEW THE DOCUMENT CONTENT.

| PROJECT ID | SOURCE LANGUAGE | TARGET LANGUAGE | SUBJECT MATTER | TOTAL # OF WORDS | # OF TUs | # OF TUs RECYCLED | END OF BIDDING | DELIVERY DATE | AWARD CRITERION | BEST OFFER | STATUS |
|---|---|---|---|---|---|---|---|---|---|---|---|
| TZ001 | ENGLISH | GERMAN | LEGAL | 32,336 | 4,211 | 482 | 25/1/99 | 28/2/99 | PRICE | 3,000 | OPEN 3 |
| TZ002 | ENGLISH | GERMAN | OFFICE | 3,602 | 412 | 48 | 21/1/99 | 8/2/99 | DATE | 21/1/99 | OPEN 7 |
| TZ009 | FRENCH | GERMAN | LEGAL | 2,736 | 271 | 42 | 22/1/99 | 28/2/99 | FIRST | -- | OPEN |
| TZ021 | ENGLISH | GERMAN | COMPUTER | 320,443 | 40,421 | 8,231 | 25/1/99 | 15/4/99 | MANUAL/PRICE | 28,000 | OPEN 5 |
| TZ052 | ENGLISH | GERMAN | OFFICE | 652 | 70 | 20 | 21/1/99 | 23/1/99 | FIRST | 23/1/99 | OPEN 7 |

FIG. 19

OFFERS FOR TZ001 FROM TRANSLATORS

HERE YOU CAN SEE THE OFFERS MADE SO FAR. TZ001 WAS POSTED WITH "AUTOMATIC AWARD" BY "PRICE".
THEREFORE, YOU CAN NOT MANUALLY AWARD THE PROJECT.

THIS SCREEN IS FOR YOUR INFORMATION ONLY.

| PROJECT ID | SOURCE LANGUAGE | TARGET LANGUAGE | SUBJECT MATTER | TOTAL # OF WORDS | # OF TUs | # OF TUs RECYCLED | END OF BIDDING | DELIVERY DATE | AWARD CRITERION | BEST OFFER |
|---|---|---|---|---|---|---|---|---|---|---|
| TZ001-01 | ENGLISH | GERMAN | LEGAL | 32,336 | 4,211 | 482 | 25/1/99 | 15/3/99 | PRICE | 3,500 |
| TZ001-02 | ENGLISH | GERMAN | LEGAL | 32,336 | 4,211 | 482 | 25/1/99 | 28/2/99 | PRICE | 3,300 |
| TZ001-03 | ENGLISH | GERMAN | LEGAL | 32,336 | 4,211 | 482 | 25/1/99 | 15/4/99 | PRICE | 3,000 |

FIG. 20

OFFERS FOR TZ021 FROM TRANSLATORS

HERE YOU CAN SEE THE OFFERS MADE SO FAR. TZ021 WAS POSTED WITH "MANUAL AWARD" BY "PRICE".
THEREFORE YOU CAN NOT MANUALLY AWARD THE PROJECT TO A GIVEN BIDDER.
TO AWARD THE PROJECT TO ONE OF THE BIDDERS CLICK ON THE PROJECT/OFFER ID YOU WISH TO SELECT.

| PROJECT ID | SOURCE LANGUAGE | TARGET LANGUAGE | SUBJECT MATTER | TOTAL # OF WORDS | # OF TUs | # OF TUs RECYCLED | END OF BIDDING | DELIVERY DATE | AWARD CRITERION | BEST OFFER |
|---|---|---|---|---|---|---|---|---|---|---|
| TZ021-01 | ENGLISH | GERMAN | COMPUTER | 320,443 | 40,421 | 8,231 | 25/1/99 | 15/4/99 | MANUAL/PRICE | 31,000 |
| TZ021-02 | ENGLISH | GERMAN | COMPUTER | 320,443 | 40,421 | 8,231 | 25/1/99 | 22/4/99 | MANUAL/PRICE | 30,500 |
| TZ021-03 | ENGLISH | GERMAN | COMPUTER | 320,443 | 40,421 | 8,231 | 25/1/99 | 22/4/99 | MANUAL/PRICE | 29,800 |
| TZ021-04 | ENGLISH | GERMAN | COMPUTER | 320,443 | 40,421 | 8,231 | 25/1/99 | 24/4/99 | MANUAL/PRICE | 29,000 |
| TZ021-05 | ENGLISH | GERMAN | COMPUTER | 320,443 | 40,421 | 8,231 | 25/1/99 | 30/4/99 | MANUAL/PRICE | 28,000 |

FIG. 21

PROJECT HISTORY

| SUBJECT'S NAME | PROJECT ID | FILE NAME | START BIDDING | AWARD DATE | DELIVERY DATE | CYCLE | NEW DELIVERY | STATUS | SERVICE CHARGE |
|---|---|---|---|---|---|---|---|---|---|
| TRADOS | TZ001 | CONTRACT.DOC | 21/01/99 | 25/01/99 | 11/2/99 | 1 | -- | PAID IN FULL | $ 2,900 |
| IBM | TZ002 | 3270INTRO.DOC | 22/01/99 | 26/01/99 | 28/2/99 | 1 | -- | PAID IN FULL | $ 700 |
| SIEMENS | TZ005 | REPORT.DOC | 9/12/98 | 12/12/98 | 25/1/99 | 1 | -- | PAID 74% | $ 740 |
| GM | TZ027 | REPAIR.DOC | 23/12/98 | 23/12/98 | 18/1/99 | 2 | 28/1/99 | REJECTED | $ 500 |

FIG. 22

WORKFLOW MANAGEMENT SYSTEM

This application is a Continuation of U.S. application Ser. No. 12/477,708, filed Jun. 3, 2009, which is a Continuation of U.S. application Ser. No. 09/317,979, filed on May 25, 1999, which is a Continuation-in-Part of U.S. application Ser. No. 09/303,499, filed on Apr. 30, 1999, which is non-provisional application claiming the benefit of U.S. Provisional Application No. 60/125,078, filed on Mar. 19, 1999, the entire contents of which are herein incorporated by reference.

The subject matter of this application is related to the subject matter of U.S. patent application entitled MACHINE-ASSISTED TRANSLATION TOOLS, Ser. No. 09/071,900, filed May 4, 1998, which is co-pending, and is hereby incorporated by reference.

BACKGROUND OF THE INVENTION

1. Field of the Invention

This invention relates to a network-based workflow management system, and more particularly, to a system suitable to coordinate the assignment and fulfillment of tasks over a network.

2. Description of the Related Technology

Outsourcing is one of the most prevalent trends in today's business environment. Nearly every company outsources some part of its business. For example, the accounts receivable collections, janitorial, and payroll functions are outsourced so frequently that it has become, over the last few decades, an accepted method for running those functions. Other functions are being outsourced with more regularity, such as computer services, benefits administration, telephone customer support, and records management. Some functions are only being outsourced by a few companies, and may require a number of years before they are more widely outsourced. These functions include engineering, financial analysis, document translation and management.

Many organizations have found that outsourcing projects, tasks or functions can be advantageous if such outsourcing has the effect of reducing transaction costs. Downes and Mui, *Unleashing the Killer App Digital Strategies for Market Dominance*, Harvard Business School Press, Boston Mass., 1998. Therefore, organizations seeking to outsource a project will submit a request for proposal to at least one service provider to obtain a quote or price for completing the project. Once the service provider has returned the proposal with a quote for completing the services, the organization will evaluate the quotes for service and select a service provider to carry out the project. The organization may use a variety of criteria to determine which service provider to select, such as the service provider's price, qualifications and reputation. Usually, the competition between service providers results in lower end cost for the organization. However, this system has no mechanism for allowing the electronic delivery of a work product or allowing completed projects or portions of any completed projects to be stored and used as a resource for subsequent projects.

By the same token, state and local governments have used contract bidding to purchase products and services, such as computers, building contractors or road maintenance equipment. Contract bidding is a process that in certain circumstances might reduce transaction costs due to the competition in bidding. In general, the contract bidding process is similar to outsourcing; for example, bids are collected, bids are evaluated and service providers are selected. This system also has no mechanism for allowing the electronic delivery of a work product or allowing completed projects or portions of any completed projects to be stored and used as a resource for subsequent projects.

An extraordinary effort is expended by some contractors to track organizations that outsource contracts or place contract awards up for bid. On-line services, such as BidNet, can collect information regarding various organizations requesting bids for projects. Usually, an on-line service collects bid request information from different agencies, e.g., state and local governments, hospitals, universities, etc., and the on-line service will provide this information to qualified contractors. For example, once a contractor has registered with the on-line service and the service has received an agency's bid request that pertains to goods or services provided by the contractor, the on-line service will generate a summary that includes bidding information, such as the agency issuing the bid, the deadline for submitting a bid, where the products and/or service must be delivered and any special specifications the agency may require. Accordingly, the summary will be mail to the contractor to assist him in determining whether to bid on the contract. While this system has the advantage of notifying a contractor of possible contracts with minimal effort required by contractor, it has the disadvantage of not providing a complete electronic workflow management system. Additionally, the on-line service does not allow users to recycle any previously completed work. Moreover, the system does not provided electronic work product delivery.

Another bidding and selling method is an auction. Auctions provide a popular and exciting marketplace for buying and selling property. Many ordinary individuals are denied access because they are required to attend an auction in person to place a bid on an item for sale. This requirement limits participation in the auction to those people who live near the auction site or those people who can afford the time and expense to travel to the auction site.

Many attempts have been made to solve the problem of gaining bid access to an auction without having to be physically present at an auction site. For example, U.S. Pat. No. 4,789,928 issued to Fujisaki on Dec. 6, 1988 describes an auction information processing system which enables individuals spread over a wide area to participate in an on-line auction. The system includes a host computer connected via communication lines to many remote terminals of individual bidders. The individual bidders enter bids from their remote terminals and the current highest bid and eventual winning bid are displayed in real-time on the remote terminals. While this system has the advantage of allowing a large number of individual bidders to participate in an on-line auction, it has the disadvantage of not allowing electronic workflow management. Furthermore, the system does not provided electronic product delivery.

Another computerized bidding system is disclosed in U.S. Pat. No. 4,903,201 issued to Wagner on Feb. 20, 1990. Wagner describes an automated futures trading exchange wherein bids to purchase or offers to sell a particular commodity contract are made by exchange members through remote terminals connected to an exchange computer. The exchange computer matches offer prices and bid prices to complete trading transactions. The system does not provided electronic product delivery.

Another system for conducting a competitive bidding procedure is disclosed in U.S. Pat. No. 5,243,515 issued to Lee on Sep. 7, 1993. Lee describes a secure teleprocessing bidding system for enabling construction subcontractors to submit bids to a general contractor for a particular construction job. Subcontractors use an ordinary telephone to dial into a central bidding computer and enter their bids. At the close of the bidding session, the central computer prints a summary report of all bids received, and the summary report is mailed or faxed to all participating bidders. As in the previous bidding systems, this system has no mechanism for allowing the electronic delivery of a work product or allowing completed projects to be stored and used as a resource for subsequent projects.

In addition to the on-line auctions mention above, on-line auctions are now being conducted over the Internet. One such auction is Save the Earth Foundation has an Artrock Auction that is described at their world-wide web site http://www.commerce.com/save_earth. To participate in the auction, bidders register and submit bids for auction items through the Internet. Bidders are notified by electronic mail when a bid higher than their own is placed on an item. The winning bidder is also contacted by electronic mail at the close of the bidding session. The Artrock Auction has no mechanism to allow electronic delivery of the product.

Similarly, Ebay has an on-line auction, as described at their world-wide web site http://www.ebay.com. In this auction system, bidders also register and submit bids through the Internet. Items for sale are graphically displayed on the bidders' screens, in addition to the bid information for each item. Bid information is updated hourly throughout each two week bidding session. Unfortunately, like the previously mentioned on-line auctions, Ebay's auction has no mechanism for allowing electronic delivery of a product.

Similarly, Christie's International describes an on-line auction at their world-wide web site http://www.christies.com. In Christie's auction, bidders register and submit bids in the same manner as the Ebay auction. Christie's on-line auction also suffers from the same disadvantage as the Ebay auction in that it has no mechanism to allow a product to be delivered electronically.

SUMMARY OF THE INVENTION

An object of the invention is to provide a marketplace for supervised contract bidding, electronic product delivery, payment and arbitration.

Another object of the invention is to provide subjects and operators access to a workflow management clearinghouse. A further object of the present invention is to provide such access over the Internet using a standardized interface format, such as Hyper Text Markup Language (HTML).

Another object of the invention is to provide user access to a clearinghouse's database(s) by entering information into electronic forms.

Another object of the invention is to provide a complete workflow management system which utilizes E-Commerce technology.

Another object of the invention is to provide a system that pools available projects and provides a live "real-time" bidding environment.

Another object of the invention is to permit photos, images and/or videos that correspond to an available project to be coupled with the project's information summary for viewing.

Another object of the invention is to provide a system where the only equipment subjects and operators need are communication devices with network access.

Another object of the invention is to reduce the effort required to complete a project by integrating a work pre-processing capability with a workflow management system.

Another object of the invention is to reduce the effort required of a translator to translate source information into target information by eliminating the need to retranslate previously translated work.

Another object of the invention is to provide a paperless workflow management system.

Another object of the invention is to reduce the amount of time or effort required to translate source text by automatically converting placeables, e.g., dates and measurement units, for insertion into a target text.

Another object of the invention is to automatically change the appearance of placeable elements to a target language format if appropriate, for example, by converting measurement units, date formats, currency values and units, titles and names, etc.

Another object of the invention is to semiautomatically insert translation units at a user-defined position in the target text upon interaction from the user, e.g., upon one or more keystrokes, upon one or more spoken commands, upon mouse clicks, etc., when translating source information.

Another objective of the invention is to provide translation memories or mini-translation memories for different subject matters.

Another objective of the invention is to match subjects' projects with operators at competitive prices.

According to the invention these objects are accomplished by a system that manages bidding and workflow where the work performed is the manipulation or delivery of electronic information. The system is particularly suited for workflow management for language or other translations, document editing, contracting for creating works of authorship such as graphics, plans software, and even data processing.

The foregoing objects may be accomplished by a clearinghouse that provides workflow management. Accordingly, the clearinghouse may have a computer with software components that may accept information from users (i.e., subjects and/or operators) over a network. In addition, the clearinghouse may accept registration information, requests and bids for projects, project information, and authorizations to Credit or debit a user's account.

According to a feature of the workflow management system, a clearinghouse may be provided to bring together organizations requiring outsourcing of a service (subjects) and service providers (operators). The clearinghouse manages the bidding and awarding of contracts, by collecting and authorizing requests for proposals (RFPs), sending bid invitations to operators that meet the requirements of the subject, sending a notification that the contract has been awarded, collecting payment from the outsourcing company and paying the service provider.

According to a feature of the invention, the clearinghouse may electronically provide to the operator information regarding the topic/subject a project along with the work product. Moreover, the completed work product may be returned to the subject electronically.

According to a feature of the invention, a clearinghouse may be provided to incorporate specialized translation memories, which are translation databases that collect translations as they are performed, along with the source language equivalents. After a translation has been performed and stored into a translation memory, the translation memory may be accessed to assist a translator with new translations where the new translations include identical or similar source language text as the source language equivalents included in the translation memory. If a subject has a document requiring translation, the system will first check whether any parts of the document can be pre-translated using a translation memory.

Accordingly, the subjects and operators may use the pre-translation information to determine an acceptable bid price. In other words, the system allows a human translator to translate only what is new in a document, and evaluate the cost for translating only the new information.

According to a feature of the invention, a clearinghouse may maintain a database to track when a translator creates a new translation unit or segment, i.e., a sentence pair with one source sentence and then a corresponding translation in the target language. A translator sends this pair back to the clearinghouse where the system stores the pair in a translation memory with the translator's name or user ID. When another translator reuses the translation unit, the original translator will receive a credit for his work. What is more, a translator may earn royalties on his translation units, in order to provide translators an incentive to share their translations with translators.

According to the invention a workflow management system may be provided that manages a computer bidding process for a translation project, awards the translation project to a translator and delivers a completed translation electronically to a subject.

A workflow management system may be provided with at least one project coordination computer module whose actions are directed by software components and at least one fulfillment computer module whose actions are directed by software components, and linked to said at least one project coordination computer module. The workflow management system may also be provided with at least one fulfillment computer module.

In addition, the software components in these computer modules operate in concert as a work flow management and work product delivery system.

These, together with other objects and advantages which will be subsequently apparent, reside in the details of construction and operation as more fully hereinafter described in the claims, with reference being had to the accompanying drawings forming a part thereof, wherein like numerals refer to like elements throughout.

BRIEF DESCRIPTION OF THE DRAWINGS

FIG. 3 shows another embodiment of the invention;
FIG. 4A shows another embodiment of the invention;
FIG. 4B shows another embodiment of the invention;
FIG. 4C shows another embodiment of the invention;
FIG. 5 shows another embodiment of the invention;
FIG. 7 shows another embodiment of the invention;
FIG. 9 shows another embodiment of the invention;
FIG. 13 shows another embodiment of the invention;
FIG. 15 shows another embodiment of the invention;
FIG. 16 shows another embodiment of the invention;
FIG. 17 shows another embodiment of the invention;
FIGS. 18A and B show another embodiment of the invention;
FIG. 19 shows another embodiment of the invention;
FIG. 20 shows another embodiment of the invention;
FIG. 21 shows another embodiment of the invention;
and
FIG. 22 shows another embodiment of the invention.

DETAILED DESCRIPTION OF THE PREFERRED EMBODIMENT

Figure 1:
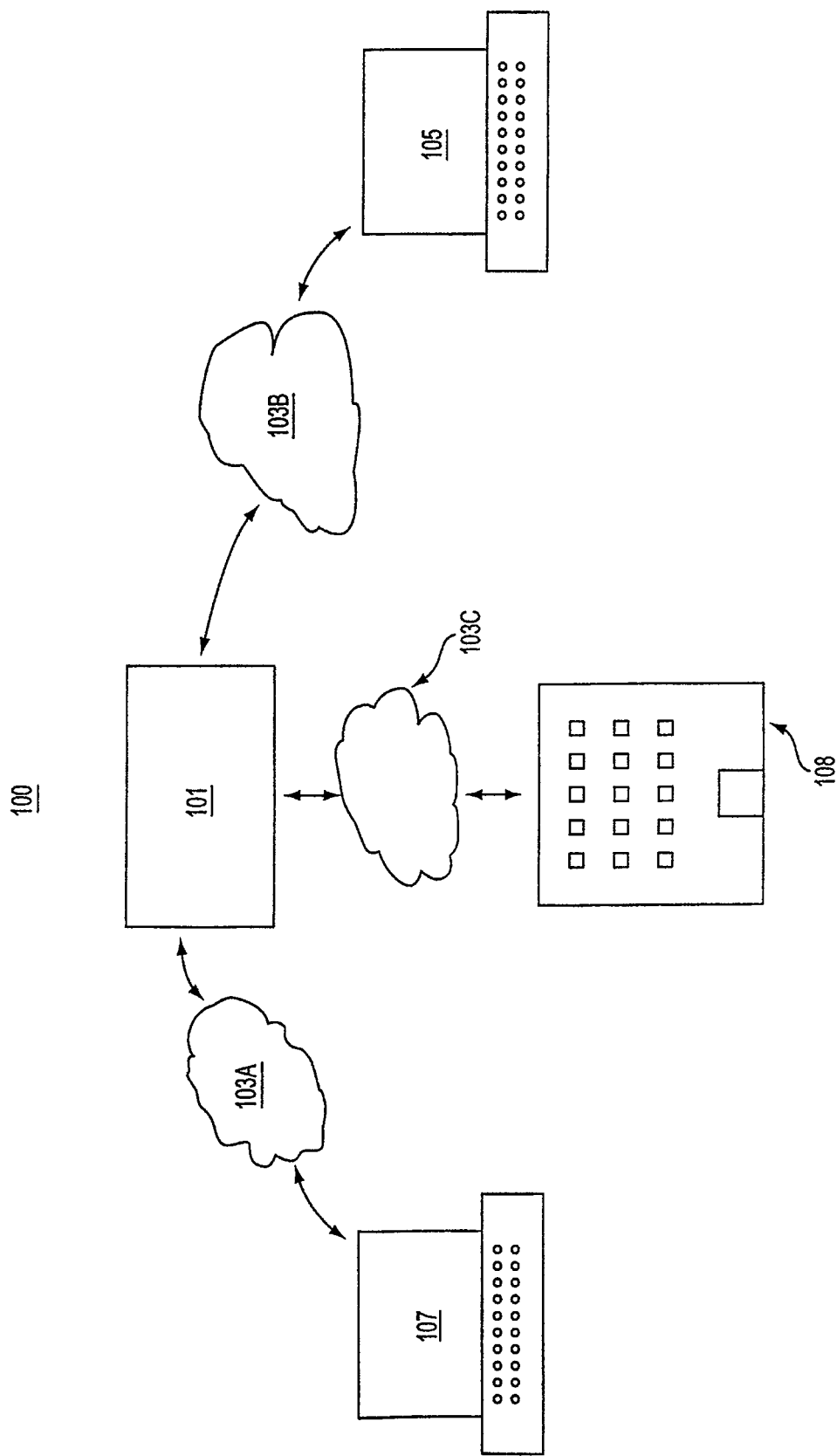
FIG. 1 shows an embodiment of the invention.

FIG. 1 shows a clearinghouse implementing the workflow management system 100. The clearinghouse 100 may be a computer with at least one electronic storage apparatus, e.g., database, which buyers (subjects) and sellers (operators) may access using an input device 105, 107, i.e., computer, wireless or landline telephone, television or personal digital assistant, with a network connection 103A, 103B. FIG. 1 shows the input devices 105, 107 connected by two separate networks, however, a single or integral network may be implemented. Preferably, information may be exchanged electronically over the network between the operators, subjects and the clearinghouse by methods, such as HTML forms, e-mail, fax. Accordingly, the clearinghouse may use electronic forms to request and/or collect information from the operator and subject: for example, user ID, password, project description, maximum bid price, bids, contact information, payment information, project criteria for example, where the project is a request for translation, the project criteria might include the target language, the source language, the subject or category that the text belongs to, the project due date, and how to award the project. In practice, the electronic forms may be downloaded from a computer module at or remote from the clearinghouse to the user's communications device, or instead, the forms may be completed directly over the Internet. Furthermore, the clearinghouse may provide an audio access and conversion system that allows an operator and/or subject to access information originally formatted for interfacing on a computer network via a telephone. Moreover, a firewall may be provided at the clearinghouse to screen the integrity of the data.

Figure 2:
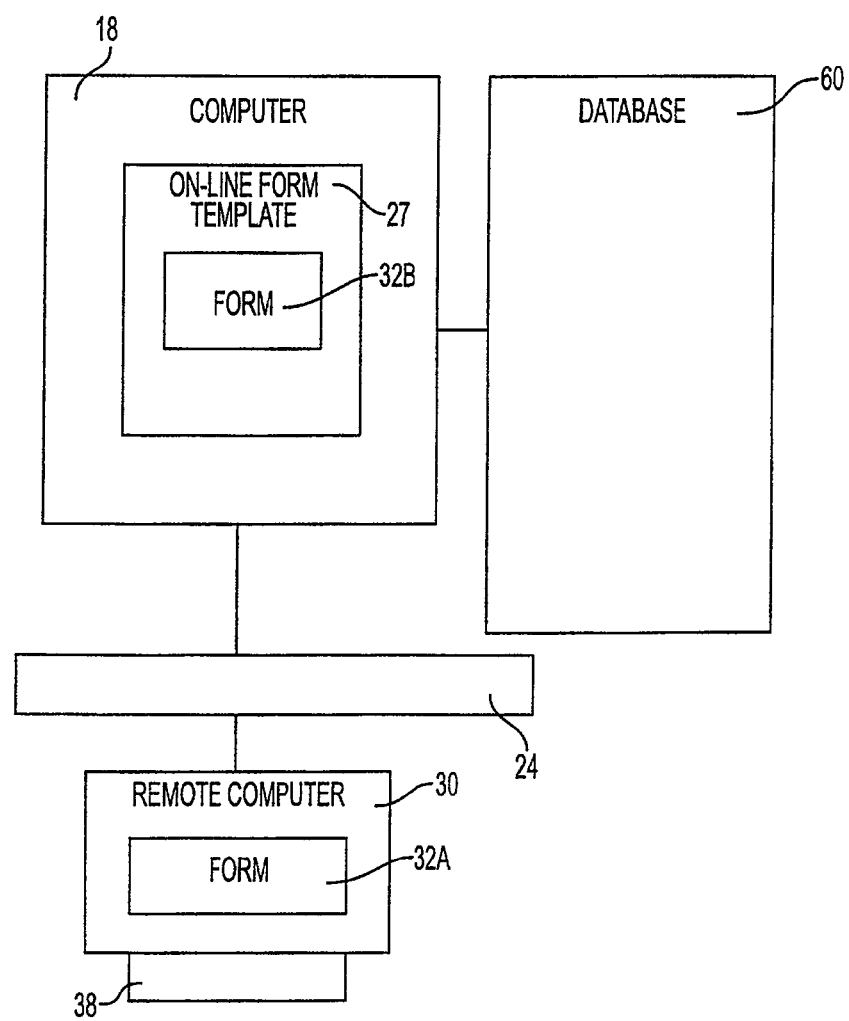
FIG. 2 shows another embodiment of the invention.

The clearinghouse may have different computer modules or systems for accomplishing the workflow management task: for example, project coordination, registration, financial, credential and verification check, project fulfillment, royalty tracking, bid management. Preferably, each module or system may be a computer module with an algorithm to accept information and complete the task required by the module. FIG. 2 illustrates the components of a generic module with connections to a remote user: for example, computer 18, on-line form template 27, form 32, optional database 60, network connection 24, remote computer 30 and user 38 (may be a subject or an operator). User 38 at remote computer 30 may access on-line form template 27 residing on computer 18. As illustrated in FIG. 2, template 27 contains a form 32, which may be displayed to user 38 on the screen of remote computer 30. Accordingly, subjects and/or operators may communicate with the clearinghouse by using electronic forms or any other known methods for collecting information over a network. In addition, the computer modules may be separate modules, however, the modules may be integrated to provide a single unit. Furthermore, the modules may store the information in an integrated database or in separate databases, which may be located at the clearinghouse or at a remote location.

According to a preferred embodiment of the present invention, a project coordination module may be provided by a clearinghouse, which may manage the flow of a project, for example, from the time a bid request is received until the completed project or completed work product is delivered.

First, a subject may submit to a project coordination module or the clearinghouse project information or a request for proposal (RFP), which may provide an operator with information: such as, the subject's background, a description of the projects, tasks or functions that require outsourcing, the specific task to be bid upon by an operator, the subject's expectations for the operator's performance, and/or a deadline for bid submission. In an alternative embodiment, shown in FIG. 3, a subject may submit information regarding specifics concerning a translation project, e.g., filename 302, source language (304, 330), target language (306, 332), subject matter (308, 334), a list of individual translators (310, 336) or translator group (314, 340) from whom bids should be solicited, translator's residency (312, 338). Accordingly, a subject may submit this information by accessing an on-line "New Projects" HTML template 27 residing on computer 18. Template 27 may contain a New Projects Request form which may be displayed to the subject 38 on the screen of remote computer 30. After the subject completes the form, the information may be transmitted to the clearinghouse for processing, where the project coordination module uses the information to conduct the bidding process or to send a request to the bid management module to initiate the bidding process.

Accordingly, the workflow management system may use only the New Projects Request form to collect data for the bidding process, or the system may use both the New Projects Request form and the complete project specifications and requirements, i.e., work subject or work product, to collect data for the bidding process. Therefore, in an alternative embodiment, the complete project specifications and requirements may be electronically transmitted (uploaded) in a text format or in a graphical format, e.g., photos, images and/or videos, to the clearinghouse or project coordination module to aid in the bidding process. The uploaded complete project specifications and requirements may be the actual project, e.g., a document requiring translation, a request for a patent search, a request for information or a paper on a particular topic, etc., or a photo, diagram, or schematic depicting the project, e.g., construction site, a circuit that requires fabrication, etc. According to an optional embodiment, the project coordination module may provide an image relating to the project that may be viewed in its entirety or may allow only limited portions to be viewed. The a preview image may provide an operator with sufficient information to allow him to determine his bid price for a project.

When a subject's new project arrives at the clearinghouse, a request may sent to a project fulfillment module, which checks a fulfillment database, to determine if any previously completed projects or portions of any completed projects may be used as a resource in connection with the new project. Accordingly, the fulfillment database may transmit fulfillment parameters, i.e., an evaluation of the relevant resources that may be reused in the new project, to the project coordination module, which may provide the fulfillment parameters to the users to assist them in negotiating a bid price. Alternately, the project fulfillment module may provide the fulfillment parameters directly to the users. The project fulfillment module and fulfillment database will be discussed in more detail below.

According to an optional embodiment, the project coordination module may send a request to a bid management module to commence the bidding process. The bid management module may work together with the project coordination module to complete the bidding process or the bid management module may handle the entire bidding process. For example, the bid management module may advise the project coordination module when an operator has been selected for the project (FIG. 20). In addition or alternatively, the bid management module or the project coordination module may send bid invitations and/or bid award notifications to the operator and/or subject, such as an e-mail, electronic broadcast message or voice mail. As illustrated in FIG. 5, the invitations and notifications may be posted on the clearinghouse's web site 520. Furthermore, the bid management module may send a selection of operator bids to the project coordination module for the subject's selection (FIG. 21). The bid management module will be discussed in detail later.

Once the bid has been awarded, the project coordination module may transmit the work subject, i.e., the complete project and/or specifications and requirements to the selected operator. When the project is completed and if the project lends itself to such, the selected operator may submit the completed project or completed work product to the project coordination module. It should be appreciated that these may be completely paperless transactions, which deliver the work product or project in an electronic format. Preferably, the project coordination module may provide the subject with a preview of the operator's completed project before agreeing to payment and electronically receiving (downloading) the project (FIG. 15). Of course, the project may be downloaded by the subject without previewing the document. Furthermore, if the subject is dissatisfied with the quality of the project, the project coordination module may allow the subject to reject the project and request that the project be corrected. If the project is rejected, the project coordination module may transmit the project to the selected operator for corrections. Once the corrections are completed, the project coordination module may transmit the corrected project to the subject for approval. Moreover, the project coordination module may also provide an arbitration means.

According to an embodiment of the present invention, a registration module may be provided by the clearinghouse, which may classify registrants as subjects or operators. As stated above, the subject and/or operator registration modules may be separate modules, however, a single or integrated module/system may be provided. Preferably, the registration system may be a computer module with an algorithm to accept user (i.e., subject and/or operator) registration information. Accordingly, a user may register with the clearinghouse by using electronic forms or any other known method for collecting registration information over a network. Furthermore, the registration modules may store the information in a single integrated database or separate databases, which may be located at the clearinghouse or at a remote location.

Figure 6:
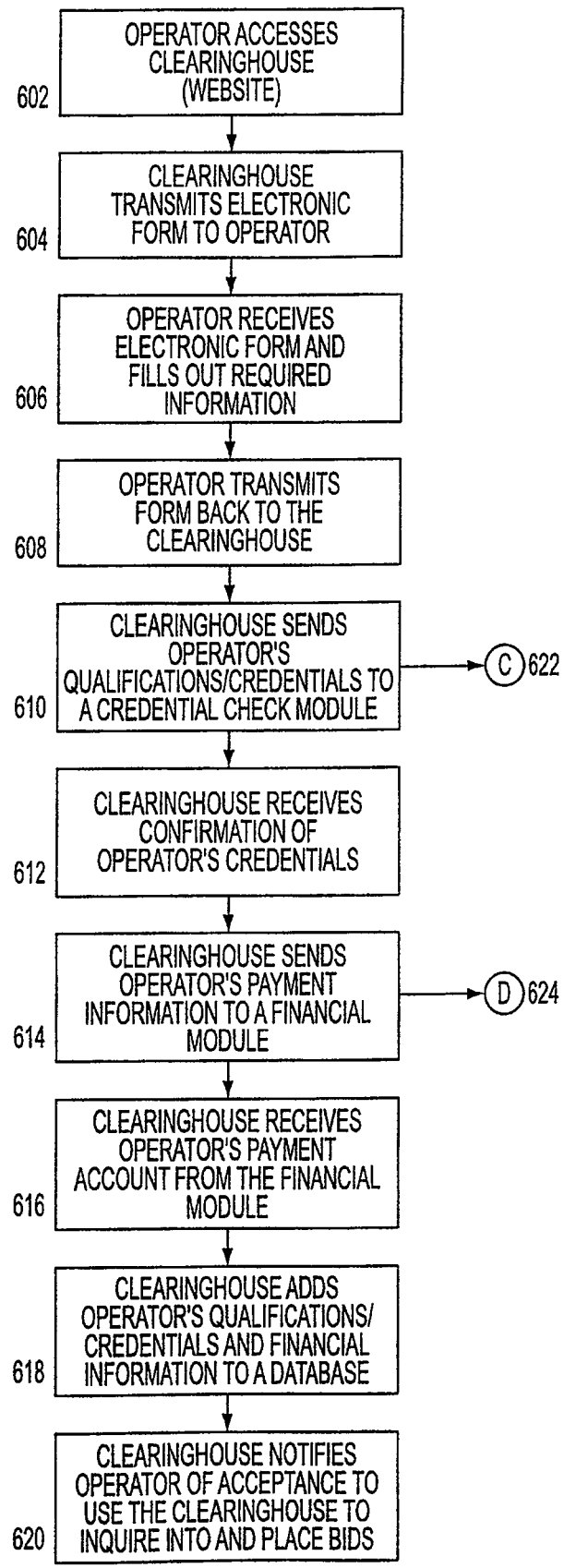
FIG. 6 shows another embodiment of the invention.

Referring to the chart of FIG. 6, an operator may access the clearinghouse's registration module, preferably, by a network connection. An operator 38 at remote computer 30 may access on-line "Registration" HTML template 27 residing on computer 18 (602). As illustrated in FIG. 2, template 27 may contain an Operator's Registration Form, which may displayed to operator 38 on the screen of remote computer 30 (604). Reference is now made to FIG. 7, which illustrates an Operator Registration Form, an operator may register with the clearinghouse by entering information into the form (606): for example, organization's name (702), translator's name (704, 706), address (708, 710, 712), e-mail address (714), telephone number (716), and type of e-commerce payment (718), source languages (720, 732), target languages (722, 734), subject areas (724, 736) and country of residence (726, 738). In an additional or alternative embodiment, the number of a checking account, savings account, or any other account in which operator 38 may receive payment credit may be entered into the form. Of course, the account may be debited when necessary, such as when an over payment is made or when a work product is returned. Finally, the operator may submit the information to the clearinghouse (608) by activating the register button 728. Then, the information may be transmitted over a communication link, e.g., wireless or landline, where the information is collected and stored in a registration database, which may be at the clearinghouse or a remote location. After the information is received, a portion or portions of the information may be transmitted to a credential check module (610, 622), e.g., operator's qualifications or credentials, and/or a financial module (614, 624), e.g., payment information. These modules will be discussed in detail later. The operator may be notified, instantaneously or at a later time, that the registration was successful by e-mail (620). The system is not limited to e-mail notifications, for example, voice mail or fax notification may be provided. In addition, the notification may be posted or transmitted directly from the clearinghouse's web site.

Figure 8:
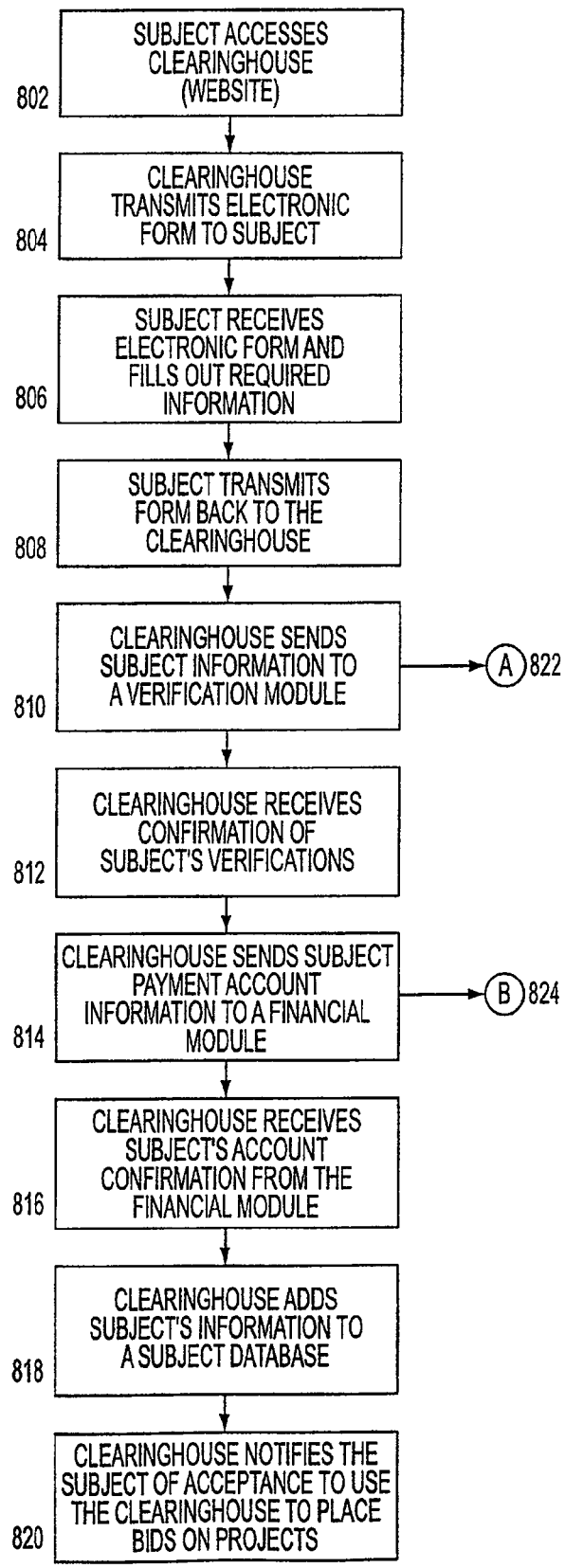
FIG. 8 shows another embodiment of the invention.
Figures 10A, 10B:
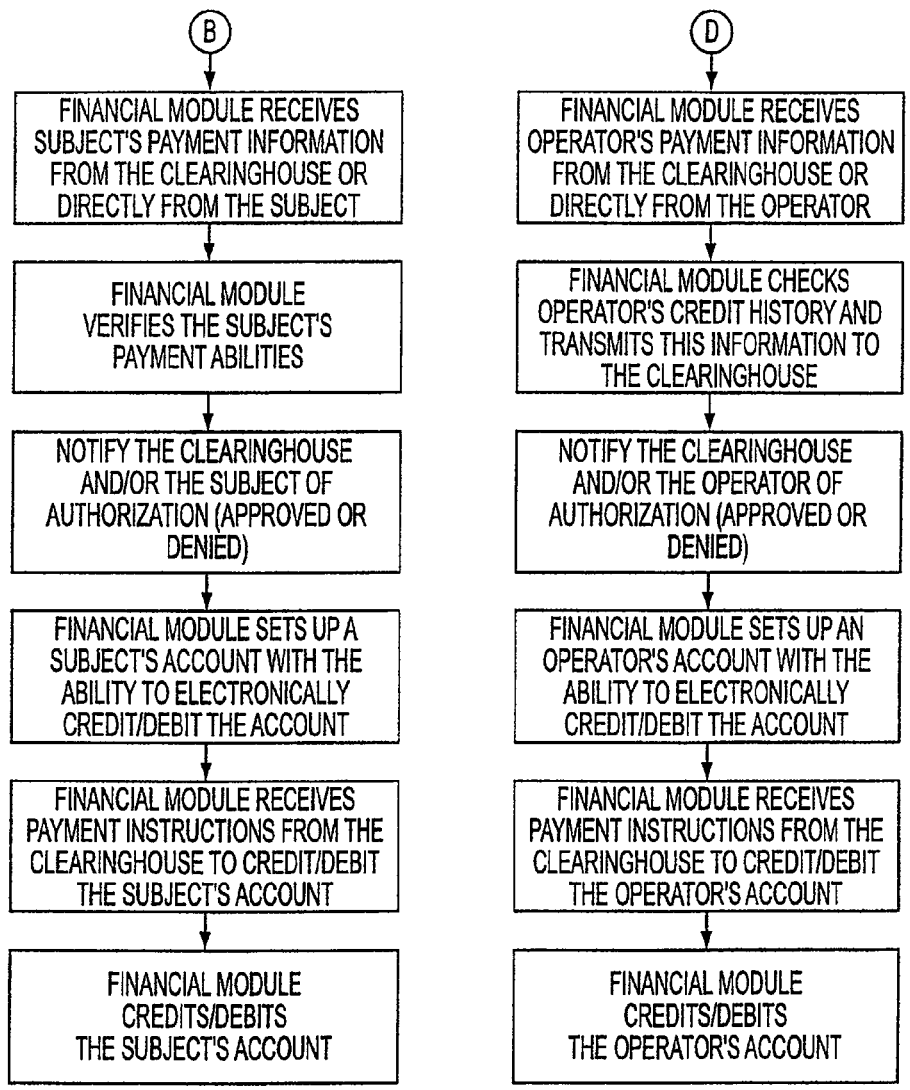
FIG. 10A shows another embodiment of the invention.
FIG. 10B shows another embodiment of the invention.

Reference is now made to FIG. 8, which illustrates a chart of the subject's registration module. The subject may register with the clearinghouse in a similar fashion as the operator. A subject 38 at remote computer 30 accesses on-line "Registration" HTML template 27 residing on computer 18 (802). As illustrated, template 27 contains a Subject's Registration Form which is displayed to subject 38 on the screen of remote computer 30 (804). First, a subject may register with the clearinghouse by entering information, (e.g., organization's name (902), contact person's name (904, 906), address (906, 908, 910), e-mail address (914), telephone number (916)) into a Subject's Registration Form (806). The subject may submit the information to the clearinghouse (808) by activating the register button (928). Then, the information may be transmitted over a communication link, e.g., wireless or landline, where the information is collected and stored in a registration database, which may be at the clearinghouse or a remote location. After the information is received, a portion or portions of the information may be transmitted to a verification module (810, 822), e.g., subject's claimed identity, and/or a financial module (814, 824), e.g., payment information. These modules will be discussed in detail below. The subject may be notified, instantaneously or at a later time, that the registration was successful by e-mail (820). The system is not limited to e-mail notifications, for example, voice mail or fax notification may be provided. In addition, the notification may be posted or transmitted directly from the clearinghouse's web site.

Figure 11:
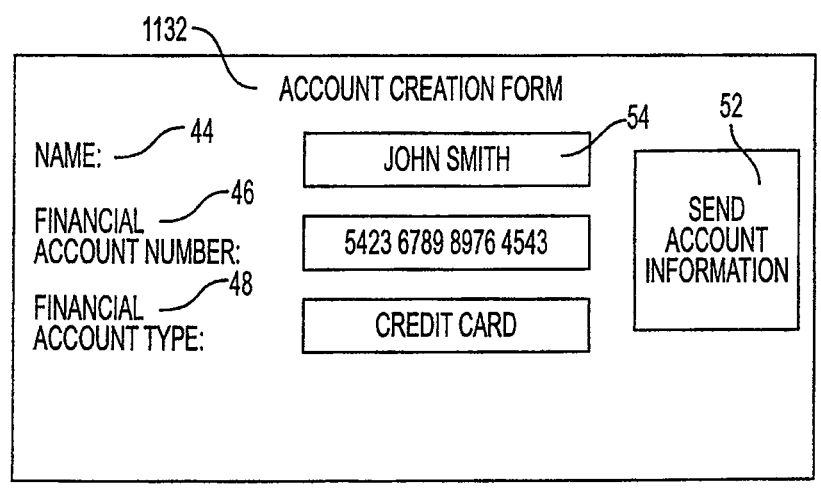
FIG. 11 shows another embodiment of the invention.

According to a preferred embodiment of the present invention, a financial module may be provided by the clearinghouse, which may link the clearinghouse to a financial institution that is equipped to handle e-commerce. Referring to FIG. 1, the clearinghouse 101 is connected to financial institution 108 by a network 103C, which may be a wireless or landline link. Preferably, the clearinghouse has to access to a financial institution, such as a bank or credit house, to establish new accounts or access a registered user's accounts. When a user registers with the clearinghouse, a payment account may be established automatically with the financial institution. The financial module may transmit to the financial institution information collected during the registration process: for example, user's name, financial account number, and financial account type. Alternately, the user may establish a payment account with the financial institution by submitting information, via electronic forms, through the financial module or directly with the financial institution. For example, FIG. 11 illustrates a Payment Account Creation Form 1132. The form has three fields 54 corresponding to a user's name 44, a financial account number 46, and a financial account type 48. In the preferred embodiment, financial account number 46 is a credit card number corresponding to a credit card account of user 38. In an alternative embodiment, the financial account number 46 may be the number of a checking account, savings account, or any other account in which a user has the ability to receive/transmit payment credits/debits. Additionally, form 32 contains a button 52 for user 38 to press to transmit the completed form 32 to computer 18. In addition, the financial module or financial institution may evaluate the subject's payment abilities and approve or deny the subject access to the clearinghouse. The financial module or financial institution may allow electronic transmission of a notification to the user indicating whether their account has been established. For example, the financial module may send an e-mail or other electronic broadcast message regarding the account's status to the user. Of course the module may provide an additional option, where by the module may generate a hard copy of the message, electronically meter the postage and sort the message for delivery. In addition, the module may allow the financial information to be updated at a later date. Once the subject's account has been established, the subject may submit a request for proposal to the clearinghouse. When the project is completed, the financial module may instruct the financial institution to deduct the funds from the subject's account.

Additionally, the financial module or the financial institution may receive the operator's preferred payment method information from the operator. Once the operator's account has been established and the operator has completed a project, the financial module may instruct the financial institution to credit the operator's account with an amount equal to the negotiated price. Similarly, the financial module has the capabilities to credit the operator's account for royalties earned. The royalty information may be received from the royalty tracking module. The royalty tracking module will be discussed later.

Furthermore, the financial module may evaluate and/or collect an operator's credit history and transmit this information to a credential check module, which will be discussed in detail later. Hence, the financial module may allow the clearinghouse to authorize new accounts, to verify the credit history of an operator, and to transfer funds, e.g., credit/debit a user's payment account.

Figure 12:
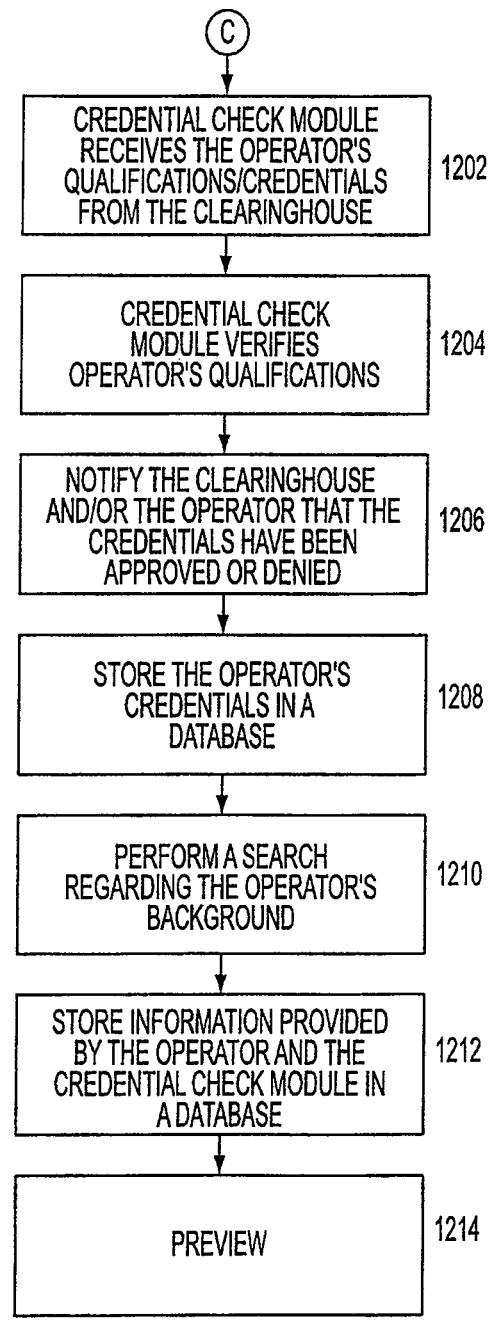
FIG. 12 shows another embodiment of the invention.

According to an embodiment of the present invention (FIG. 12), an operator's credential check module may be provided by the clearinghouse, which may verify an operator's credentials and may supply this information to the subjects. The clearinghouse may optionally maintain a credential database with other information regarding an operator, such as qualifications, evaluations given by other subjects for the job performance the operators may be have performed and general comments. During registration, an operator's qualifications may transmitted to the credential check module (1202) where the information may be stored. The computer module may be programmed to check on-line sources to confirm the operator's qualifications (1204). In addition or in the alternative, the clearinghouse may conduct independent research to determine the operator's qualifications (1210), and this information may be stored in the credential database (1212). As stated previously, the clearinghouse or the credential check module may provide electronic evaluation forms for subjects to fill out regarding operators that have perform services for them. This information may be collected and maintained in the credential database. Another option that may be provided by the clearinghouse is that subjects may preview this information at any time (1214).

Figure 14:
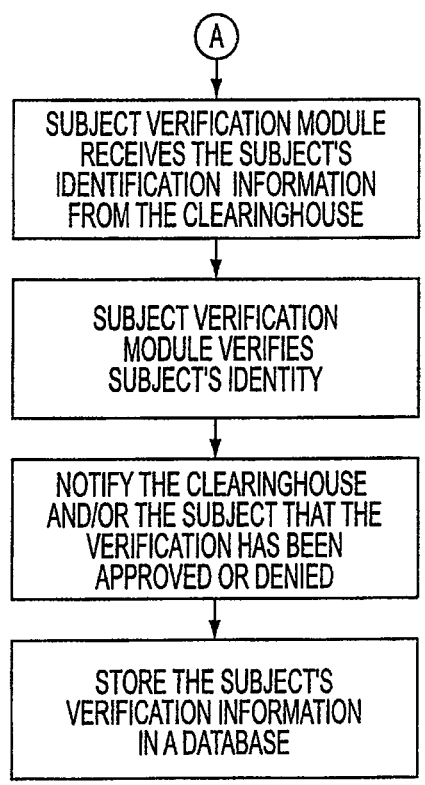
FIG. 14 shows another embodiment of the invention.

According to a preferred embodiment of the present invention, a subject verification module may be provided, which may verify the subjects identity (FIG. 14). The verification module provides an additional security feature for the work flow management system.

According to a preferred embodiment of the present invention, a project fulfillment module may be provided by the clearinghouse, which may store completed projects or portions of previously completed projects in a fulfillment database to be used as a resource for subsequent projects. In addition, the clearinghouse may setup or load the fulfillment database with project resources. Preferably, the project fulfillment module may be a computer module with an algorithm to accept completed projects or portions of completed projects and store them in a fulfillment database. Moreover, the algorithm may evaluate whether any portion of a new project has been previously completed in connection with a prior project. The project fulfillment module may supply fulfillment parameters to the users. The fulfillment parameters are an evaluation of "how much" of a new project may be supplied by the fulfillment database. The project coordination module may provide the evaluation information or fulfillment parameters to the operators and/or subjects.

After the project coordination module receives a project request, the project coordination module may interrogate the project fulfillment module to determine whether a similar project is stored in the fulfillment database, i.e., the database is interrogated to determine whether any stored resources may be recycled to fulfill the subject's project request. Accordingly, this information may be provided to the operator and/or the subject to assist in negotiating a bid price.

For example, if none of the previously completed projects or resources stored in the fulfillment database match the newly requested project, the recycle module may notify the project coordination module, which may alert the bid management module to initiate a bid process for the subject's project request. On the other hand, if a new project request is identical to a project stored in the fulfillment database, the clearinghouse or the project coordination module may perform or complete the project without requiring an operator's assistance. Thus the project coordination module may transmit a price quote to the subject. If the subject agrees to the price, the project may be electronically delivered and the subject's payment account may be debited as discussed with respect to the financial module. The details of the document delivery transaction are discussed in detail in the description of the project coordinate module. In addition, the project fulfillment module may send a notification to the royalty tracking module, which identifies the operator that completed the original project. The details of this transaction are discussed in the description of the royalty tracking module.

If the new project request is similar to a resource, a completed project or a portion of one or more of the projects stored in the fulfillment database, the clearinghouse may transmit a fulfillment parameter notification to the subject and/or operator, which indicates "how much" of the project may be recycled to assist them in determining a bid price. The project fulfillment module may send a notification to the royalty tracking module, which identifies, for example, the amount of the recycled information used in connection with the new project, the operator that originally generated the recycled information and the operator that used the recycled information in connection with the new project. As stated above, the details of this transaction are discussed in the description of the royalty tracking module.

In another embodiment, the project fulfillment module may include a translation database. According to this embodiment, the translation database may collect translations as they are performed, if the translation is performed "on-line", or after they have been performed and submitted, if they have been performed "off-line" and uploaded upon completion. In this fashion, the translation database may be updated to include new translations. This translation database may be used to "pre-translate" project documents prior to releasing them for bid. Alternatively, or in addition, after a translation project has been assigned to a translator, the translator may be given access to the translation database to assist him with performance of the assigned translation. The translation database optionally may store translations in the form of pairs or sets of translation segments comprising corresponding words or phrases in two or more languages. The clearinghouse may provide translation memories with terms that are specialized to a certain field or subject matter such as, legal, medical or business.

According to another embodiment, the clearinghouse may provide translation software to assist translators with translation projects. Such translation software may be a machine-assisted tool that actively supports the translation process by automatically suggesting existing translations and terminology from the translation database. An example of a commercially available machine-assisted tool is the Translator's Workbench supplied by TRADOS GmbH (Germany). According to an optional aspect of this embodiment, a translator may perform the translation "on-line" with direct access to the translation software and the translation database, or a translator may download the translation software and relevant portions of the translation database and perform the translation "off-line." Accordingly, the translation database optionally may be divided into subject matter, e.g., legal, medical or business, and/or language fields so that a translator need not access or download the entire translation database in performance of a particular translation.

An advantage of the above-described translation database and translation software is that they make the translation process more efficient by ensuring that a translator need not translate a source segment that has already been translated. While a translator works, the translation software operates in the background to 'learn' original sentences and their corresponding translations. In the process, this data may be uploaded into the translation database a the clearinghouse. Concurrently, the translation software access, therewith, the translation database to rapidly find identical or similar sentences and automatically display them as a working basis for a translation in progress.

Translation software is most useful when it is are able to locate not only identical matches to stored translation segments, but also approximate or "fuzzy" matches. Fuzzy matching facilitates retrieval of text that differs slightly in word order, morphology, case, or spelling. The approximate matching is necessary because of the large variety possible in natural language texts. Fuzzy matching to find sentences with similar content has seen its performance perfected by the implementation of neural network technology. The translator has the option of choosing among alternative translations in addition to the one automatically suggested by the translation memory. Along with the source sentence and its translation, each translation segment can also include information on users, dates and frequency of use, and classifying attributes and text fields. This information enables easy maintenance of translation databases, which naturally become quite large over time.

According to a preferred embodiment of the present invention, a royalty tracking module may be provided by the clearinghouse, which may track or monitor when an operator's work is reused to fulfill a project. As mention above, the project fulfillment module may send a notification to the royalty tracking module, which identifies, for example, the amount of the recycled information used in connection with the new project, the operator that originally generated the recycled information and the operator that used the recycled information in connection with the new project. This may be accomplished by relating the operator's user ID to a completed project. Creators of any reused information may get credit or royalty for the use of their information. In this fashion the subsequent use of translation segments can be tracked. This tracking can be used to allocate credits of royalties to the operator that generated the translation units. Therefore, creators of any reused translation units may get credit or royalties for the use of their translation units.

According to a preferred embodiment of the present invention, a bid management module may be provided by the clearinghouse, which may execute and monitor the bidding process. In addition, the module may maintain a database of qualified bidders, identify and notify qualified operators of request for bid, accept bids from the operators and award bids based on the subject criteria.

The bid management module may receive information regarding a subject's request for bid either from the project coordination module or directly from the subject. Preferably, the bid module may be a computer module with an algorithm adapted to accept subject and/or operator bid information. In addition, the bid management module may perform calculations to determine the bid award. As illustrated in FIG. 3, a subject may submit information, via the New Projects Request Form, to the bid management module regarding how to award the project: for example, maximum price (318, 342), maximum # of bidders (320, (344), award method (322, 346) (i.e., automatic, manual or a combination), award date (324, 348) award preference (326, 350) (e.g., best price, earliest delivery date, first bidder). The bid management module need not be limited to these criteria, and other limitation may be used to determine bid awards.

In addition, as illustrated in FIG. 13, the bid management module may provide features for the subject to restrict the invitations for bid to a limit groups of bidders. For example, the subject may select the operators individually or limited the operators by different criteria, e.g., the source and target language, the project subject matter, operator's qualifications, etc. The bid management module may accept the criteria submitted by electronic forms, as discussed above. The bid management module may determine a group of qualified bidders. The bid module may send a request to the check credential module to confirm a bidder's qualifications.

Once a group of qualified operators has been determined, the bid management module may notify qualified operators by an electronic notification, or a bid request may be posted on the clearinghouse's web site. Referring to FIG. 5, the clearinghouse may provide an operator with information regarding his current status. For example, the number of current bid invitations or number of newly awarded projects.

The bid management module may provide information to the operator, concerning the RFP, for example, file name or project ID, source language, target language, subject matter, total number of words, total number of translation units, number of recycled translation units, number of new words, end of bidding, date of delivery, maximum price, award criterion, award decision, maximum number of bids, status, best offer (FIGS. 4A and 19). The bid management module may provide a transaction history, as depicted in FIG. 4C. The operator may review all this information and submit a bid via electronic form. The bid management module accepts bids and updates the bid preview information form FIG. 4B. The bid module may award the bid and notify the operator and/or subject.

According to one embodiment of the present invention, a clearinghouse may be used to manage translators (operators) and organizations (subjects) that require document translation. When international companies enter new foreign markets and "localize" a product or service for the new market, a great deal of documentation must be translated, creating a need for cost-effective translation. The demand for translation of commercial and technical documents represents a large and growing segment of the translation market. Examples of such documents are contracts, instruction manuals, forms, and computer software. During the general course of business, many small translation jobs, which may consist of one to five pages of text on a wide variety of topics, ranging from legal text to office memos, are generated. Because commercial and technical documents are often detailed and precise, accurate translations continue to be in demand. Throughout the world, multilingual cultures and multinational trade create an increasing demand for translation services.

When seeking to outsource translation work, companies must conduct research in sources like the yellow pages to locate the telephone numbers and addresses of translators. Once a translator is located, they must be contacted either by a letter or telephone to request a sample translation or to get a quotation for translation service. Research must be conducted to determine the translator's qualifications. Substantial additional work is involved before the translator starts to translate the first word.

To save time and effort, documents requiring translations have been outsourced to translation agencies, which have a group of translator contractors that they hire to perform translations. This method saves time and effort; however, it increases the cost of the translation by adding a middleman and not allowing free market competition for the price of the translation. In addition, this method is limited by the agencies' contacts, geographic location and the physical exchange of the documents.

The following is an example of how the workflow management system operates for document translation. A subject or organization has a document requiring translation into a target language. The subject connects to a website provided by a clearinghouse, such as http://www.XXXXX.com. If it is the first time a subject or organization is using the workflow management system, he may register with the clearinghouse by downloading an on-line Subject Registration Form and filling out the requested information, such as company name (902), name of contact person (904, 906), address (908, 912), e-mail address (914), telephone (916), type of e-commerce payment (918). Once a subject is registered, he may fill in an on-line form, a New Project Request Form (FIG. 3), that describes and classifies the document requiring translation. The on-line form will request certain criteria (e.g., the target language (306, 332), the source language (304, 330), the subject or category that the text belongs to (30S, 334), the project due date, and how to award the project (322, 324, 326, 346, 348, 350)). By activating button 328, the form is electronically transmitted (uploaded) to the clearinghouse along with the actual document to be translated. Of course, the subject may submit an RFP to the clearinghouse.

Once the project information has been uploaded to the clearinghouse, the fulfillment database may be checked to determine how much of the project may be completed by recycling previously translation units created in performance of previous projects (translations) to generate pre-translation information, i.e., fulfillment parameters. This feature provides consistency and reduces errors, because there is no need to re-translation previously translated work.

As illustrated in FIG. 16, the project may be put into a pool of open projects for on-line bidding along with the pre-translation information. Referring to FIG. 16, project TZ001 is an legal document in English requiring translation into German. TZ001 has 4,211 translation units of which 482 translation units can be recycled using relevant resources from the fulfillment database. The clearinghouse or the bid management module may notify translators (operators) with qualifications, which match the subject's bid criteria, that a translation project is available for bid (FIG. 5). As see in FIG. 19, the operator can view or preview the information provided by the subject, and make on-line price bids for completion of the translation project (FIG. 4B). First time operators may register with a clearinghouse in fashion similar to the subject except they enter information such as, a credit card number if they do not wish to receive monthly checks, source languages, target languages, subject areas and their country of residence. The operator may also be required to submit proof of his qualifications. This information may be uploaded by the system or mailed into the clearinghouse for evaluation by the credential check module.

Depending on the subject's bid criteria settings, a project may be awarded automatically by the bid management module, or the subject can preview the bids or a subset of bids for manual selection of the award. FIG. 20 shows a subject the bids made for project TZ001 since the subject's criterion was for an automatic award based on price the screen is provided for information purposes only. FIG. 21 shows a subject the bids made for project TZ021 since the subject's criterion was for an manual award based on price the screen allows a subject to selected a translator by clicking on the project ID.

The clearinghouse may provide a credential check service for the subjects to preview information regarding the translators. Subjects can review such information as evaluations given by other subjects for each job performance the translator has performed, and general comments can be stored regarding the translator.

Once a translator has been selected for a given project, he may use a pre-translation memory stored on in the translation database to pre-translate the document. The royalty tracking module can be used to allocate credits of royalties for the recycled translation units to the source translator of the translation units. If the translator of a new project uses existing translation units, creators of any such reused translator units may get credit or royalty for the use of their translation units. After the translator is finished, the translator will transmit (post) the translated file to the project coordination module and the clearinghouse will, in turn, notify the subject that the work is complete. As illustrated in FIG. 17, the subject may preview the work before authorizing payment. If the subject is dissatisfied with the translation, he may request that the translation be corrected. The project coordination module or the royalty tracking module may maintain financial records for both the translators (operators) and the organizations (subjects) and periodically send the translators payment both for original translation work as well as royalties earned through the reuse of the stored translation units. The subjects may pay invoices directly using either credit cards or electronic cash payments to the clearinghouse or the financial institution.

FIGS. 4A-C, 5 and 15-20 show various screens for a translation embodiment that may provide information to the workflow management users. FIG. 4A illustrates a project description screen for project TZ001 that an operator may review before submitting an Offer Form depicted in FIG. 4B. The screen in FIG. 4A provides information such as, file name (402), source language (404), target language (406), subject matter (408), total number of words (410), the number of TUs (412), the number of TUs recycled (414), total number of new words (416), end of bidding date (418), delivery date (420), maximum price (422), award criterion (424), award decision (426), maximum number of bids (428), status (430) and best offer (432). A user may review a project's activities by accessing a Transaction History Screen illustrated in FIG. 4C. This screen provides information about the activity or action, who performed the action and when it was performed.

FIG. 5 illustrates the Translator's Home Page where a translator may access information such as, the number of projects translated (502), the number of projects a translator is assigned (504), the number bid invitations (506), the total amount of recycled translation units the translator has used to complete his projects (508), the total number of translation units the translator owns (510), the number of translation units owned by the translator reused by other translators (512), the total amount of royalties earned for recycled translation units (514), the operator's current balance (518), and the number of projects awarded to the translator since his last visit to the clearinghouse site (520).

FIG. 15 illustrates a screen, Subject's Home Page, where a subject may access information such as, the number of projects translated (1502), the number of projects in progress (1504), the number of projects waiting to be awarded (1506), the total amount of translation units in a subject's projects (1508), the total number of translation units that have been recycled (1510), the number of recycled words (1512), the estimated savings at an average price/word (1514), the subject's current balance (1516), the number of projects finished and waiting to be downloaded (1518).

FIG. 16 illustrates the Translation Bidding Pool. Projects that are currently open for bid may be previewed by the users using this screen, which provides information, such as, project ID (1602), source language (1604), target language (1606), subject matter (1608), total number of words (1610), number of TUs (1612), number of TUs recycled (1614), end of bidding date (1616), delivery date (1618), award criterion (1620), best offer (1622), status (1624), etc. The operators may click on the Project ID to preview a selection of the document before placing a bid.

FIGS. 17, 18A and 18B illustrate views that may be provided to the users for Projects in Progress. These views provide the users with information such as, the translator's/subject's name, project ID, file name, start bidding date, award date, delivery date, cycle, new delivery, status, next action, etc. The subject can see the translator assigned to a project, when it is due for delivery, etc. The translator may accept a project by clicking on Download in the Next Action field (note the Status will change from "Awarded" to "Translate" and Next Action will change from "Download" to "Upload"). The translator may download the project again, if needed, by clicking on the Project ID. When an operator has completed a translation, he clicks on Upload in the Next Action field to transmit the document back to the clearinghouse. After the system verifies a successful upload, the subject will be notified to receive and accept the translation. Then, the translator may be credited for his services. The project Status will change to Paid in Full. The project details will be shuffled to the Project History Screen, which provides information such as, subject's name, project ID, file name, start bidding, award date, delivery date, cycle new delivery, status service charge (FIG. 22).

Once the translation project has been completed, a subject may confirm acceptance by clicking on Accept in the Next Action field (FIG. 17). The Status will change from "Uploaded" to "Paid in Full". If a subject does not accept the project, after reading random excerpts of the translation work, he may have three options:

1. The subject may reject the work entirely. In that case the translator may only receive 50% of the original sum. The credential module may be notified and the subject may be unable to use the translation.

2. The subject may file a Fix-It request, stating his reasons for rejecting the project and set a new Delivery Date. He may also ask for a service charge reduction. A new work cycle will be initiated. The translator may reject the fix it request. If the translator and the subject have not come to terms after three Fit-It cycles, the system may either close the project and file it as Paid in Half, or if a larger sum is at stake, may escalate the case to the arbitration board.

3. The subject may call the arbitration board immediately in cases of severe business misconduct. The board may then hear both sides and suggest a remedy.

Another application of the invention may be for other non-translation (projects) work assignments. For example, a subject may need research performed relating to a specified topic, such as a patent search, medical or legal research. If the fulfillment database is checked and no previously stored resources match the new project, the project coordination module and/or bid management module may institute a bidding process by posting a request for bids or sending bid invitations to qualified researchers (operators). The bid winner (operator) may conduct a search and transmit the results of the search to the project coordination module. Then the project coordination module may transmit the results to the subject and store the results in the fulfillment database. The next time a similar request is made for a search project or work assignment on the same subject matter (or similar), the project coordination module may search the fulfillment database for the earlier results. These earlier results may be exactly what the subject is looking for in which case the results may be sent directly to the subject or the earlier results may form the basis for further research. The original researcher may receive a credit for his work.

If the stored results need to be updated, the project fulfillment module may provide evaluation information to the subjects and the operators regarding "how much" of the search project may be completed by recycling a previously completed research (resources).

Both Netscape Navigator and Microsoft Internet Explorer browsers as well as other browsers can view the pages because the active pages are executed on the server and delivered to the client computer as simple HTML.

While the invention has been particularly shown and described with reference to a preferred embodiment thereof, it will be understood by those skilled in the art that the foregoing and other changes in form and details may be made therein without departing from the scope of the invention.

We claim:

1. A method for providing a workflow management system, said method comprising:
    maintaining a database configured to store translation segments, said translation segments identifying target language phrases in a target language that corresponds to source language phrases in a source language;
    identifying translators connected to a network using a translator identity for each of a plurality of different translators;
    storing translation segments submitted by a plurality of different translators;
    storing information by the database, the information identifying a translator that has submitted a translation segment of the submitted translation segments, by storing the translation segment in association with the translator identity of the translator that has submitted the translation segment;
    identifying translation segments for inclusion in at least partially translated content;
    delivering as part of a translation task said at least partially translated content electronically, said at least partially translated content including segments translated into said target language; and
    tracking the translator identity associated with a translation segment when the translation segment is selected for use in said at least partially translated content.

2. The method for providing a workflow management system according to claim 1, wherein said method further comprises:
    receiving new content to be translated from the source language into the target language;
    identifying segments that have been previously translated; and
    inserting said previously translated segments into said at least partially translated content.

3. The method for providing a workflow management system according to claim 1, further comprising searching said database for previously translated translation segments to generate pre-translation information for content to be translated, said pre-translation information identifying translation segments.

4. The method for providing a workflow management system according to claim 3, wherein said at least partially translated content includes said pre-translation information and segments to be translated.

5. The method for providing a workflow management system according to claim 4, further comprising delivering said at least partially translated content to a translator via an Internet connection.

6. The method for providing a workflow management system according to claim 5, further comprising delivering said at least partially translated content to a translator in a form suitable for viewing by a web browser.

7. The method for providing a workflow management system according to claim 1, wherein the translator identity is a translator username permitting the translator access to the workflow management system.

8. The method for providing a workflow management system according to claim 1, further comprising checking a translator's credentials prior to allowing the translator to submit a translation segment for storage in said database.

9. The method for providing a workflow management system according to claim 1, further comprising giving credit to a translator who provided a translation segment when the translation segment is used.

10. The method for providing a workflow management system according to claim 1, further comprising identifying one of said translation segments from said database by an identical match between content to be translated and a source language phrase of a stored translation segment.

11. The method for providing a workflow management system according to claim 1, further comprising identifying one of said translation segments from said database by an approximate match between content to be translated and a source language phrase of a stored translation segment.

12. The method for providing a workflow management system according to claim 11, wherein said approximate match facilitates retrieval of text that differs slightly in at least one of word order, morphology and spelling.

13. The method for providing a workflow management system according to claim 1, further comprising:
   identifying a translation segment from said database by an identical match between content to be translated and a source language phrase of a stored translation segment; and
   identifying a translation segment from said database by an approximate match between content to be translated and a source language phrase of a stored translation segment.

14. The method for providing a workflow management system according to claim 1, wherein said approximate match facilitates retrieval of text that differs slightly in at least one of word order, morphology and spelling.

15. The method for providing a workflow management system according to claim 1, further comprising:
   notifying translators to submit bids;
   receiving bids from at least one translator;
   determining a bid award; and
   sending a bid award notification.

16. The method for providing a workflow management system according to claim 1, further comprising:
   managing an automated bidding process for a translation project, said translation project including a document requiring translation from a source language into the target language; and
   interrogating a fulfillment database to determine fulfillment parameters for said translation project, the fulfillment parameters being based on identification of at least one relevant resource including translation segments capable of being used in said translation project, the translation segments being derived from previously translated translation projects.

17. The method for providing a workflow management system according to claim 16, further comprising:
   transmitting said at least one relevant resource from the fulfillment database to a project coordination module.

18. The method for providing a workflow management system according to claim 1, said method comprising:
   receiving a request for a translation project, said request including a document requiring translation from a source language into a target language; and
   determining if any previously completed translation projects or portions of any completed translation projects are available as a resource in connection with the translation project.

* * * * *